(12) United States Patent
Hutt et al.

(10) Patent No.: US 7,203,332 B2
(45) Date of Patent: Apr. 10, 2007

(54) MAGNET ARRANGEMENT FOR LOUDSPEAKER

(75) Inventors: Steven W. Hutt, Bloomington, IN (US); John F. Steere, Martinsville, IN (US); David B. Garner, Indianapolis, IN (US); Louis A. Mango, Trafalgar, IN (US)

(73) Assignee: Harman International Industries, Incorporated, Northridge, CA (US)

( * ) Notice: Subject to any disclaimer, the term of this patent is extended or adjusted under 35 U.S.C. 154(b) by 257 days.

(21) Appl. No.: 10/429,163

(22) Filed: May 2, 2003

(65) Prior Publication Data

US 2004/0022406 A1 Feb. 5, 2004

Related U.S. Application Data

(60) Provisional application No. 60/380,001, filed on May 2, 2002, provisional application No. 60/378,188, filed on May 6, 2002, provisional application No. 60/391,134, filed on Jun. 24, 2002.

(51) Int. Cl.
*H04R 1/02* (2006.01)

(52) U.S. Cl. .................. 381/399; 381/408; 381/421

(58) Field of Classification Search ............ 381/396, 381/399, 408, 421, 423, 431, 176, 178, 386, 381/394, 395, 412; 264/272.11
See application file for complete search history.

(56) References Cited

U.S. PATENT DOCUMENTS

| | | | |
|---|---|---|---|
| 1,643,791 A | | 9/1927 | Slepian |
| 2,496,483 A | * | 2/1950 | Massa .................. 381/426 |
| 2,566,604 A | * | 9/1951 | Eaves .................. 381/160 |
| 3,141,071 A | | 7/1964 | Rich .................. 381/408 |
| 3,164,686 A | | 1/1965 | Tibbetts |
| 3,342,953 A | * | 9/1967 | Pless .................. 381/400 |
| 3,570,626 A | | 3/1971 | Mochida et al. |
| 3,654,403 A | | 4/1972 | Bobb .................. 381/423 |

(Continued)

FOREIGN PATENT DOCUMENTS

DE 1 799 329 11/1959

(Continued)

OTHER PUBLICATIONS

"Dynamic Amplitude Shading of Electronically Steered Line Source Arrays," an Audio Engineering Society Preprint 3272; Richard Schmidmaier, Munchen, Germany; David G. Meyer, School of Electrical Engineering, Purdue University, West Lafayette, Indiana.

(Continued)

*Primary Examiner*—Sinh Tran
*Assistant Examiner*—Brian Ensey
(74) *Attorney, Agent, or Firm*—Pauley Petersen & Erickson

(57) ABSTRACT

An electro-dynamic loudspeaker includes a frame, a plurality of magnets and a diaphragm. The frame includes a molded plastic body. The magnets may be molded into the frame in a determined configuration. The frame is mechanically coupled to the diaphragm such that the magnets are a determined distance from the diaphragm. The diaphragm may include a conductor applied to a surface of the diaphragm. The diaphragm may be driven by a motive force created when current passes through the conductor within a magnetic field formed by the magnets. The electrical current may be varied to create an acoustical output from the electro-dynamic loudspeaker.

25 Claims, 23 Drawing Sheets

U.S. PATENT DOCUMENTS

| | | | |
|---|---|---|---|
| 3,674,946 A | 7/1972 | Winey | 381/408 |
| 3,919,499 A | 11/1975 | Winey | |
| 4,037,061 A | 7/1977 | von Recklinghausen | 381/408 |
| 4,210,786 A | 7/1980 | Winey | |
| 4,264,789 A | 4/1981 | Kaizu et al. | |
| 4,281,223 A | 7/1981 | Ugaji et al. | 381/408 |
| 4,316,062 A | 2/1982 | Beveridge | 381/191 |
| 4,384,173 A | 5/1983 | Briefer et al. | 381/431 |
| 4,468,530 A | 8/1984 | Torgeson | 381/402 |
| 4,471,172 A | 9/1984 | Winey | 381/427 |
| 4,471,173 A | 9/1984 | Winey | 381/408 |
| 4,480,155 A | 10/1984 | Winey | |
| 4,484,037 A | 11/1984 | Nieuwendijk et al. | |
| 4,536,623 A | 8/1985 | Larson | |
| 4,544,805 A | 10/1985 | Sawafuji et al. | |
| 4,584,439 A | 4/1986 | Paddock | 381/189 |
| 4,653,103 A | 3/1987 | Mori et al. | |
| 4,672,675 A * | 6/1987 | Powell et al. | 381/395 |
| 4,703,510 A | 10/1987 | Larson | |
| 4,723,296 A | 2/1988 | Nieuwendijk et al. | |
| 4,750,257 A | 6/1988 | Larson | 29/594 |
| 4,803,733 A | 2/1989 | Carver et al. | 381/193 |
| 4,837,838 A | 6/1989 | Thigpen et al. | 381/158 |
| 4,924,504 A | 5/1990 | Burton | |
| 4,939,784 A | 7/1990 | Bruney | |
| 5,021,613 A | 6/1991 | Garcia | |
| 5,148,493 A | 9/1992 | Bruney | |
| 5,195,143 A | 3/1993 | Spiegel | |
| 5,283,836 A | 2/1994 | Trufitt | |
| 5,297,214 A | 3/1994 | Bruney | 381/203 |
| 5,430,805 A | 7/1995 | Stevenson et al. | 381/203 |
| 5,627,903 A | 5/1997 | Porrazzo et al. | |
| 5,682,436 A | 10/1997 | Sakamoto et al. | |
| 5,764,595 A | 6/1998 | Power | |
| 5,850,461 A | 12/1998 | Zelinka | 381/398 |
| 5,901,235 A | 5/1999 | Thigpen | |
| 5,905,805 A | 5/1999 | Hansen | 381/398 |
| 5,953,438 A | 9/1999 | Stevenson et al. | |
| 5,961,762 A | 10/1999 | Zelinka et al. | 156/164 |
| 6,008,714 A | 12/1999 | Okuda et al. | |
| 6,097,830 A | 8/2000 | Zelinka et al. | 381/431 |
| 6,104,825 A | 8/2000 | Thigpen | 381/408 |
| 6,154,557 A | 11/2000 | Montour et al. | |
| 6,185,310 B1 | 2/2001 | Kermani et al. | 381/431 |
| 6,546,106 B2 | 4/2003 | Azima | |
| 6,845,166 B2 | 1/2005 | Hara et al. | |
| 2001/0009586 A1 | 7/2001 | Suzuki | 381/151 |
| 2001/0048256 A1 | 12/2001 | Miyazaki et al. | 310/81 |
| 2002/0071590 A1* | 6/2002 | Han et al. | 381/412 |
| 2002/0191808 A1 | 12/2002 | Croft, III et al. | 381/431 |
| 2003/0228029 A1* | 12/2003 | Graebener | 381/432 |

FOREIGN PATENT DOCUMENTS

| | | |
|---|---|---|
| DE | 30 33 631 A1 | 4/1982 |
| DE | 30 38 905 A1 | 5/1982 |
| EP | 0 966 311 A1 | 4/2000 |
| EP | 1 158 835 A2 | 11/2001 |
| EP | 1 194 001 A1 | 4/2002 |
| FR | 2 765 767 A1 | 1/1999 |
| GB | 2 034 153 A | 5/1980 |
| JP | 54076130 | 6/1979 |
| JP | 54098612 | 8/1979 |
| JP | 57184398 | 11/1982 |
| JP | 01228300 | 9/1989 |
| JP | 08331684 | 12/1996 |
| WO | WO 95/24815 | 9/1995 |

OTHER PUBLICATIONS

"Line Arrays: Theory and Applications," Audio Engineering Society, Convention Paper 5304; Mark S. Ureda, JBL Professional, Northridge, CA; presented at the 110th Convention May 12-15, 2001, Amsterdam, The Netherlands.

EDM Charmilles; A Practical Guide to Electro-Discharge Machining: Ateliers des Charmilles S.A. (p. 12-13).

Furihata et al., "Acoustic characteristics of an electrodynamic planar digital loudspeaker." J Acoustical Society of America 114(1):174-184, Jul. 2003.

"Analysis of Loudspeaker Line Arrays" by Mark S. Ureda, J. Audio Eng. Soc., vol. 52 No. 5.. May 2004.

* cited by examiner

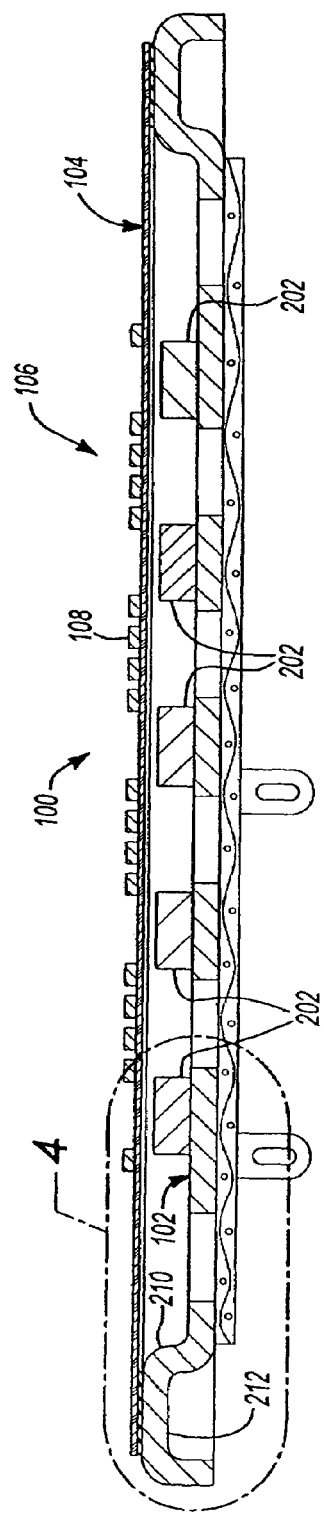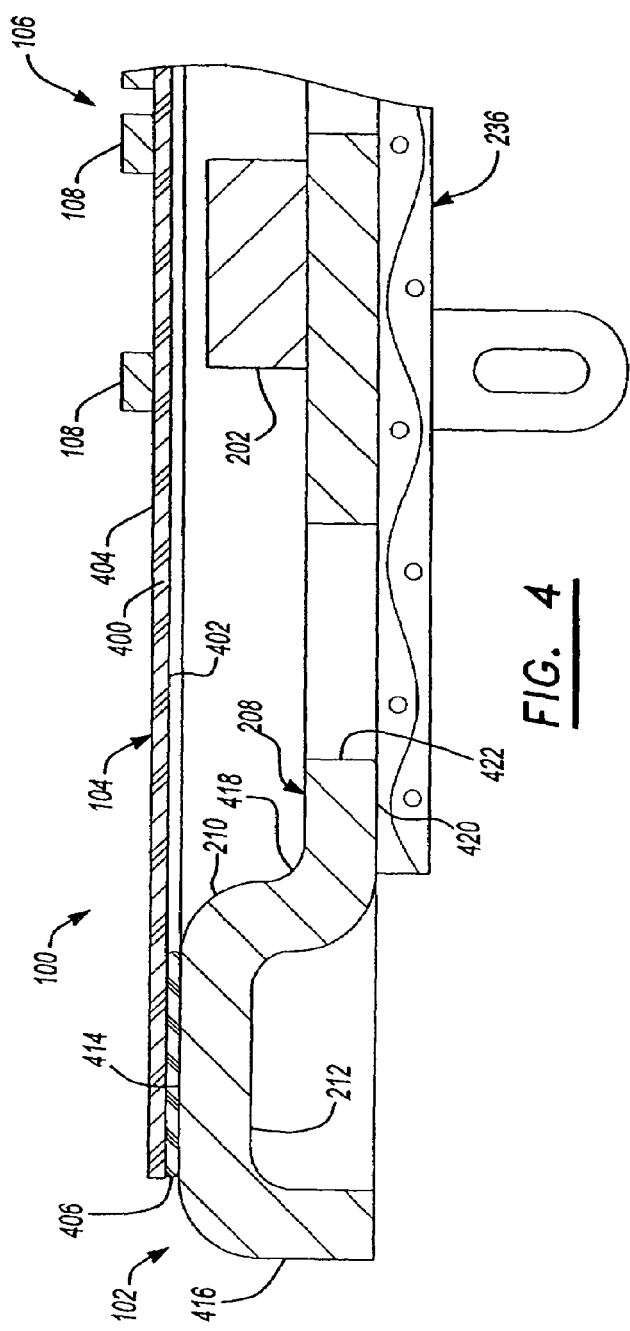
FIG. 3
FIG. 4

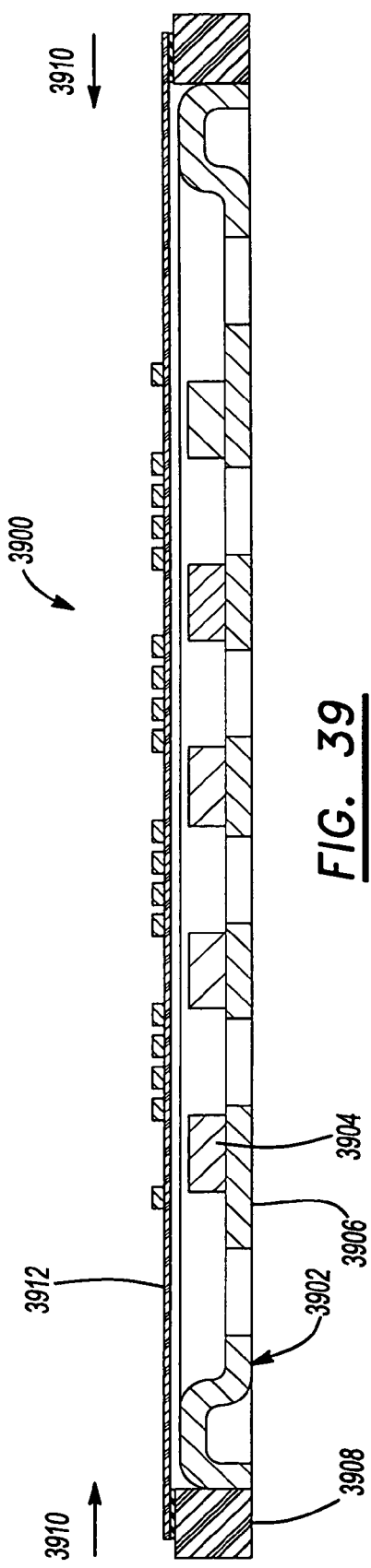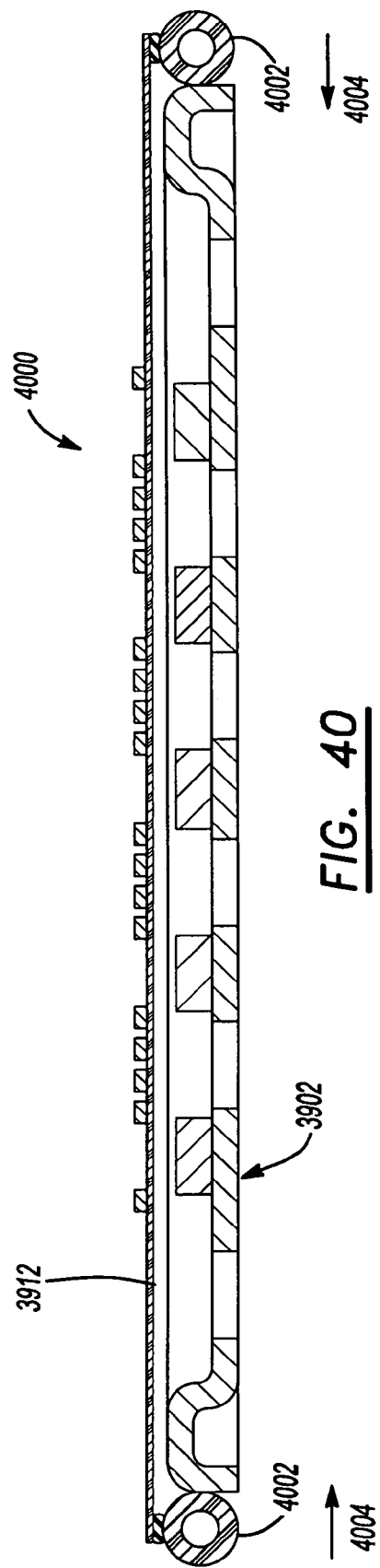

MAGNET ARRANGEMENT FOR LOUDSPEAKER

CROSS-REFERENCE TO RELATED APPLICATIONS

This application claims the benefit of U.S. Provisional Application No. 60/380,001, filed on May 2, 2002; U.S. Provisional Application No. 60/378,188, filed on May 6, 2002; and U.S. Provisional Application No. 60/391,134, filed on Jun. 24, 2002. The disclosures of the above applications are incorporated herein by reference.

This application incorporates by reference the disclosures of each of the following applications which have been filed concurrently with this application: U.S. patent application Ser. No. 10/428,313, entitled "Mounting Bracket System," filed May 2, 2003; U.S. patent application Ser. No. 10/429,165, entitled "Film Tensioning System," filed May 2, 2003; U.S. patent application Ser. No. 10/428,316, entitled "Film Attaching System," filed May 2, 2003; U.S. patent application Ser. No. 10/429,228, entitled "Electrical Connectors For Electro-Dynamic Loudspeakers," filed May 2, 2003; U.S. patent application Ser. No. 10/428,314, entitled "Electro-Dynamic Loudspeaker Mounting System," filed May 2, 2003; U.S. patent application Ser. No. 10/429,173, entitled "Conductors For Electro-Dynamic Loudspeakers," filed May 2, 2003; U.S. patent application Ser. No. 10/429,164, entitled "Frame Structure," filed May 2, 2003; U.S. patent application Ser. No. 10/429,289, entitled "Acoustically Enhanced Electro-Dynamic Loudspeakers," filed May 2, 2003; U.S. patent application Ser. No. 10/429,162, entitled "Directivity Control Of Electro-Dynamic Loudspeakers," filed May 2, 2003; and U.S. patent application Ser. No. 10/429,243, entitled "Frequency Response Enhancements For Electro-Dynamic Loudspeakers," filed May 2, 2003.

BACKGROUND OF THE INVENTION

1. Field of Invention

The invention relates to electro-dynamic loudspeakers, and more particularly, to improvements for electro-dynamic loudspeakers and related manufacturing methods.

2. Related Art

The general construction of an electro-dynamic loudspeaker includes a diaphragm, in the form of a thin film, attached in tension to a frame. An electrical circuit, in the form of electrically conductive traces, is applied to the surface of the diaphragm. Magnetic sources, typically in the form of permanent magnets, are mounted adjacent to the diaphragm or within the frame, creating a magnetic field. When current is flowing in the electrical circuit, the diaphragm vibrates in response to the interaction between the current and the magnetic field. The vibration of the diaphragm produces the sound generated by the electro-dynamic loudspeaker.

Many design and manufacturing challenges present themselves in the manufacturing of electro-dynamic loudspeakers. First, the diaphragm, that is formed by a thin film, needs to be permanently attached, in tension, to the frame. Correct tension is required to optimize the resonance frequency of the diaphragm. Optimizing diaphragm resonance extends the bandwidth and reduces sound distortion of the loudspeaker.

The diaphragm is driven by the motive force created when current passes through the conductor applied to the diaphragm within the magnetic field. The conductor on the electro-dynamic loudspeaker is attached directly to the diaphragm. Because the conductor is placed directly onto the thin diaphragm, the conductor should be constructed of a material having a low mass and should also be securely attached to the film at high power (large current) and high temperatures.

The frame of the electro-dynamic loudspeaker supports the magnets, the diaphragm, and the terminal. The frame presents its own design challenges. The frame must be capable of being bonded to the diaphragm film. The frame must be rigid enough to maintain the diaphragm film in uniform tension and not be susceptible to deforming during handling, assembly, or over time. A ferrous frame has the advantage of being capable of carrying magnetic energy or flux. The frame also should be capable of withstanding high environmental temperatures, humidity, salt spray, etc.

Alternatively, a plastic frame has an advantage in that the underlying process and mold tooling can be designed with spring loaded inserts to provide very precise control of the separation distance between the top of the imbedded magnets and the film conductor. This control is effective even for magnet lots with relatively high thickness variation. Such improved control allows wide tolerance and more economic magnet specifications. In addition, because separation distance variation is reduced, and process to design capability is improved, performance may be improved by reducing and minimizing the mean separation distance between driver and magnets. Finally, the plastic frame molding process readily and economically accepts various additional and beneficial features such as locators and mounting tabs that can be incorporated into the part at little added cost. This capability improves application value.

Accordingly, designing conductors for electro-dynamic loudspeaker applications presents various challenges such as selecting the speaker with the desired audible output for a given location that will fit within the size and location constraints of the desired applications environment. Electro-dynamic loudspeakers exhibit a defined acoustical directivity pattern relative to each speaker's physical shape and the frequency of the audible output produced by each loudspeaker. Consequently, when an audio system is designed, loudspeakers possessing a desired directivity pattern over a given frequency range are selected to achieve the intended performance of the system. Different loudspeaker directivity patterns may be desirable for various loudspeaker applications. For example, for use in a consumer audio system for a home listening environment, a wide directivity may be preferred. In the application of a loudspeaker, a narrow directivity may be desirable to direct sound, e.g., voice, in a predetermined direction.

Often, space limitations in the listening environment prohibit the use of a loudspeaker in an audio system that possesses the preferred directivity pattern for the system's design. For example, the amount of space and the particular locations available in a listening environment for locating and/or mounting the loudspeakers of the audio system may prohibit the use of a particular loudspeaker that exhibits the intended directivity pattern. Also, due to space and location constraints, it may not be possible to position or oriented the desired loudspeaker in a manner consistent with the loudspeaker's directivity pattern. Consequently, size and space constraints of a particular environment may make it difficult to achieve the desired performance from the audio system. An example of a listening environment having such constraints is the interior passenger compartment of an automobile or other vehicle.

While the electric circuitry of electro-dynamic loudspeakers may present design challenges, electro-dynamic loudspeakers are very desirable loudspeakers because they are designed to have a very shallow depth. With this dimensional flexibility, electro-dynamic loudspeakers may be positioned at locations where conventional loudspeakers would not traditionally fit. This dimensional flexibility is particularly advantageous in automotive applications where positioning a loudspeaker at a location that a conventional loudspeaker would not otherwise fit could offer various advantages. Further, because the final loudspeaker assembly may be mounted on a vehicle, it is important that the assembly be rigid during shipping and handling so that the diaphragm or frame does not deform during installation.

While conventional electro-dynamic loudspeakers are shallow in depth and may therefore be preferred over conventional loudspeakers for use in environments requiring thin loudspeakers, electro-dynamic loudspeakers have a generally rectangular planar radiator that is generally relatively large in height and width to achieve acceptable operating wavelength sensitivity, power handling, maximum sound pressure level capability and low-frequency bandwidth. Unfortunately, the large rectangular size results in a high-frequency beam width angle or coverage that may be too narrow for its intended application. The high-frequency horizontal and vertical coverage of a rectangular planar radiator is directly related to its width and height in an inverse relationship. As such, large radiator dimensions exhibit narrow high-frequency coverage and vice versa.

SUMMARY

The invention provides several frame structures and methods for constructing frames related to electro-dynamic loudspeakers. The electro-dynamic loudspeakers include a frame, a plurality of magnets and a diaphragm. The frame may be molded from plastic to include the magnets molded into the frame. The magnets may be embedded into the frame during the frame molding process.

Embedding the magnets in the frame may involve placing the magnets in an injection mold and injecting molten resin around the magnets to partially encapsulate the magnets within the resin. The magnets may include a first magnet embedded in the frame in a first row and a second magnet embedded in the frame in a second row. Each of the first and second rows may include a plurality of longitudinally extending magnets. The magnets may be positioned end-to-end in a plurality of rows. Magnets may be positioned in the first row with polarity that is opposite to the polarity of the magnets positioned in the second row. Each of the magnets may include a first surface that is coplanar with an inner surface of the frame and a second surface of the magnets that extends into the frame towards an outer surface of the frame.

The diaphragm may be mounted to the frame a determined distance from the magnets. Magnetic fields produced between the rows of magnets may interact with a magnetic field produced with electrical signals provided on a conductor coupled with the diaphragm. The diaphragm may include a thin film. The film may be movable in response to the interaction between the magnetic fields produced by the magnets and the magnetic field produced with the electrical signals. The resulting movement of the film may produce sound.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 3 is a cross-sectional view of the electro-dynamic loudspeaker taken along line 3—3 of FIG. 1.

FIG. 4 is an enlarged cross-sectional view of the encircled area of FIG. 3.

FIG. 39 is a cross-sectional view of another example loudspeaker.

FIG. 40 is a cross-sectional view of still another example electro-dynamic loudspeaker.

DETAILED DESCRIPTION

Figure 1:
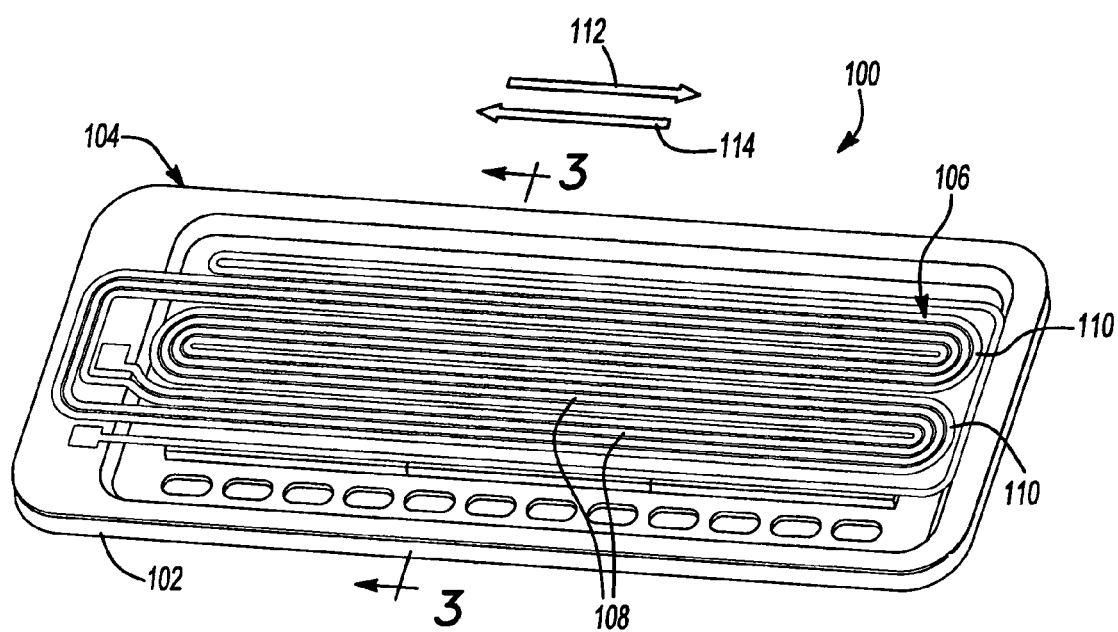
FIG. 1 is a perspective view of an electro-dynamic loudspeaker as it would appear with the grille removed.

FIG. 1 is a perspective view of an electro-dynamic loudspeaker 100 of the invention. As shown in FIG. 1, the electro-dynamic loudspeaker is a generally planar loudspeaker having a frame 102 with a diaphragm 104 attached in tension to the frame 102. A conductor 106 is positioned on the diaphragm 104. The conductor 106 is shaped in serpentine fashion having a plurality of substantially linear sections (or traces) 108 longitudinally extending along the diaphragm interconnected by radii 110 to form a single current path. Permanent magnets 202 (shown in FIG. 2) are positioned on the frame 102 underneath the diaphragm 104, creating a magnetic field.

Linear sections 108 are positioned within the flux fields generated by permanent magnets 202. The linear sections 108 carry current in a first direction 112 and are positioned within magnetic flux fields having similar directional polarization. Linear sections 108 of conductor 106 having current flowing in a second direction 114, that is opposite the first direction 112, are placed within magnetic flux fields having an opposite directional polarization. Positioning the linear sections 108 in this manner assures that a driving force is generated by the interaction between the magnetic fields developed by magnets 202 and the magnetic fields developed by current flowing in conductor 106. As such, an electrical input signal traveling through the conductor 106 causes the diaphragm 104 to move, thereby producing an acoustical output.

Figure 2:
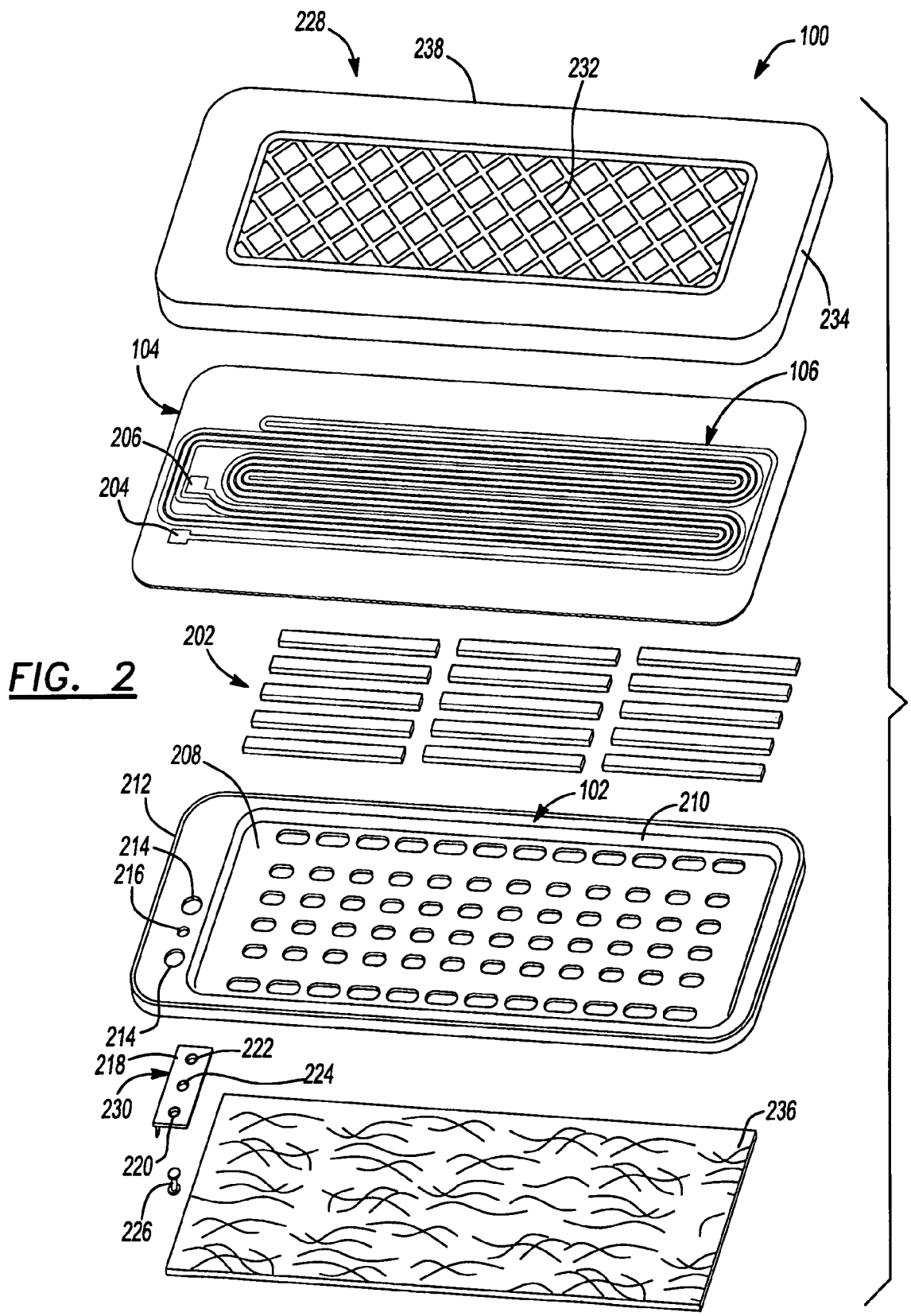
FIG. 2 is an exploded perspective view of the electro-dynamic loudspeaker shown in FIG. 1 having a grille.

FIG. 2 is an exploded perspective view of the electro-dynamic loudspeaker 100 shown in FIG. 1. As illustrated in FIG. 2, the flat panel loudspeaker 100 includes a frame 102, a plurality of high energy magnets 202, a diaphragm 104, an acoustical dampener 236 and a grille 228. Frame 102 provides a structure for fixing magnets 202 in a predetermined relationship to one another. In the depicted embodiment, magnets 202 are positioned to define five rows of magnets 202 with three magnets 202 in each row. The rows are arranged with alternating polarity such that fields of magnetic flux are created between each row. Once the flux fields have been defined, diaphragm 104 is fixed to frame 102 along its periphery.

A conductor 106 is coupled to the diaphragm 104. The conductor 106 is generally formed as an aluminum foil bonded to the diaphragm 104. The conductor 106 can, however, be formed from other conductive materials. The conductor 106 has a first end 204 and a second end 206 positioned adjacent to one another at one end of the diaphragm 104.

As shown in FIG. 2, frame 102 is a generally dish-shaped member preferably constructed from a substantially planar contiguous steel sheet. The frame 102 includes a base plate 208 surrounded by a wall 210. The wall 210 terminates at a radially extending flange 212. The frame 102 further includes apertures 214 and 216 extending through flange 212 to provide clearance and mounting provisions for a conductor assembly 230.

Conductor assembly 230 includes a terminal board 218, a first terminal 220 and a second terminal 222. Terminal board 218 includes a mounting aperture 224 and is preferably constructed from an electrically insulating material such as plastic, fiberglass or other insulating material. A pair of rivets or other connectors (not shown) pass through apertures 214 to electrically couple first terminal 220 to first end 204 and second terminal 222 to second end 206 of conductor 106. A fastener such as a rivet 226 extends through apertures 224 and 216 to couple conductor assembly 230 to frame 102.

A grille 228 functions to protect diaphragm 104 from contact with objects inside the listening environment while also providing a method for mounting loudspeaker 100. The grille 228 has a substantially planar body 238 having a plurality of apertures 232 extending through the central portion of the planar body 238. A rim 234 extends downward, substantially orthogonally from body 238, along its perimeter and is designed to engage the frame 102 to couple the grille 228 to the frame 102.

An acoustical dampener 236 is mounted on the underside of the base plate 208 of the frame 102. Dampener 236 serves to dissipate acoustical energy generated by diaphragm 104 thereby minimizing undesirable amplitude peaks during operation. The dampener 236 may be made of felt, or a similar gas permeable material.

FIG. 3 is a cross-sectional view of the electro-dynamic loudspeaker taken along line 3—3 of FIG. 1. FIG. 3 shows the frame 102 having the diaphragm 104 attached in tension to the frame 102 and the permanent magnets 202 positioned on the frame 102 underneath the diaphragm 104. Linear sections 108 of the conductor 106 are also shown positioned on top of the diaphragm 104.

FIG. 4 is an enlarged cross-sectional view of the encircled area of FIG. 3. As illustrated by FIG. 4, the diaphragm 104 is comprised of a thin film 400 having a first side 402 and a second side 404. First side 402 is coupled to frame 102.

Generally, the diaphragm 104 is secured to the frame 102 by an adhesive 406 that is curable by exposure to radiation. However, the diaphragm 104 may secured to the frame 102 by other mechanism, such as those known in the art.

To provide a movable membrane capable of producing sound, the diaphragm 104 is mounted to the frame in a state of tension and spaced apart a predetermined distance from magnets 202. The magnitude of tension of the diaphragm 104 depends on the speaker's physical dimensions, materials used to construct the diaphragm 104 and the strength of the magnetic field generated by magnets 202. Magnets 202 are generally constructed from a highly energizable material such as neodymium iron boron (NdFeB), but may be made of other magnetic materials. The thin diaphragm film 400 is generally a polyethylenenaphthalate sheet having a thickness of approximately 0.001 inches; however, the diaphragm film 400 may be formed from materials such as polyester (e.g., known by the tradename "Mylar"), polyamide (e.g., known by the tradename "Kapton") and polycarbonate (e.g., known by the tradename "Lexan"), and other materials known by those skilled in the art for forming diaphragms 104.

The conductor 106 is coupled to the second side 404 of the diaphragm film 400. The conductor 106 is generally formed as an aluminum foil bonded to diaphragm film 400, but may be formed of other conductive material known by those skilled in the art.

The frame 102 includes a base plate 208 surrounded by a wall 210 extending generally orthogonally upward from the plate 208. The wall 210 terminates at a radially extending flange 212 that defines a substantially planar mounting surface 414. A lip 416 extends downwardly from flange 212 in a direction substantially parallel to wall 210. Base plate 208 includes a first surface 418, a second surface 420 and a plurality of apertures 422 extending through the base plate 208. The apertures 422 are positioned and sized to provide air passageways between the first side 402 of diaphragm 104 and first surface 418 of frame 102. An acoustical dampener 236 is mounted to second surface 420 of frame base plate 208.

Figure 5:
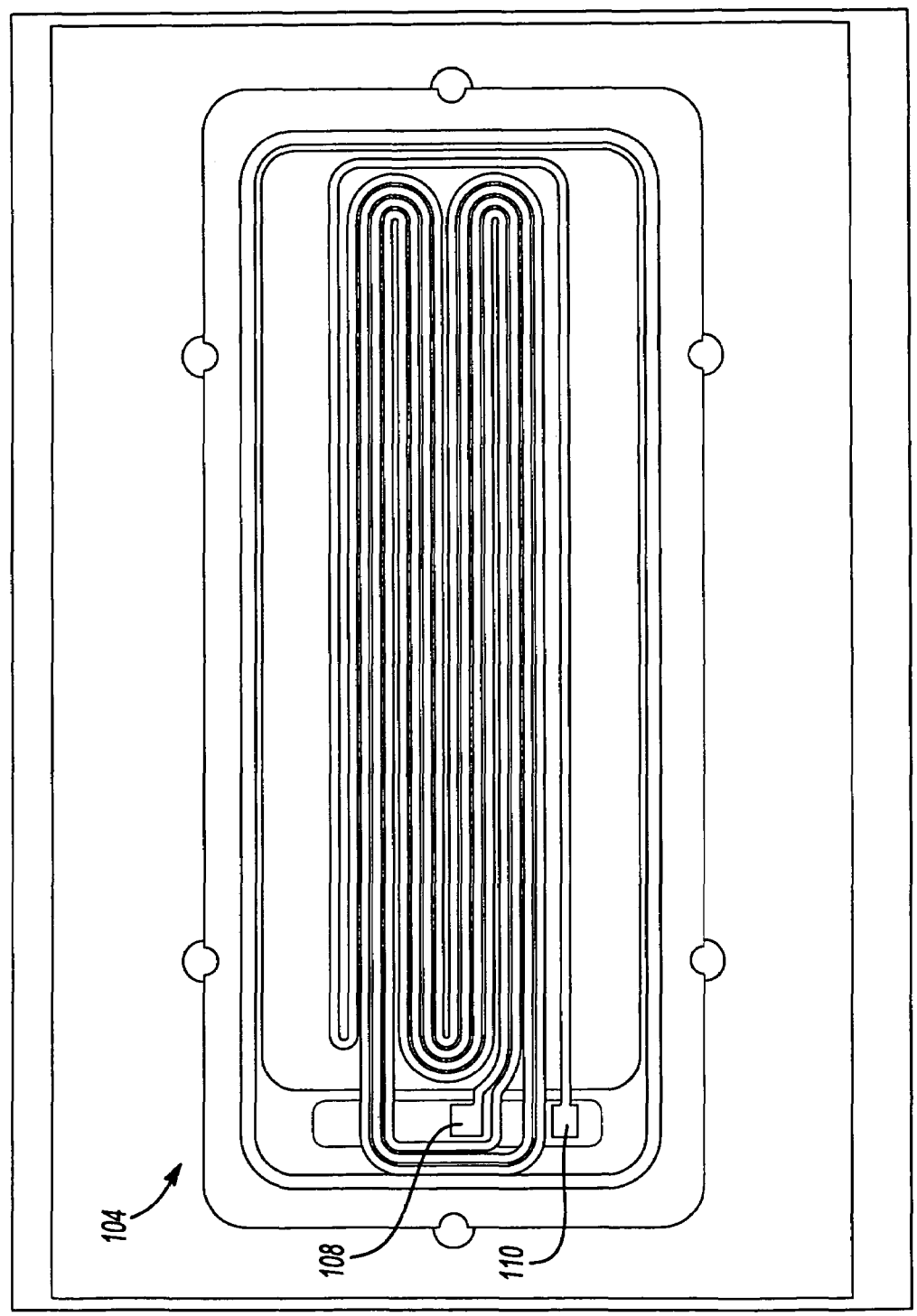
FIG. 5 is a plan view of a film included in the electro-dynamic loudspeaker of FIG. 1.
Figure 6:
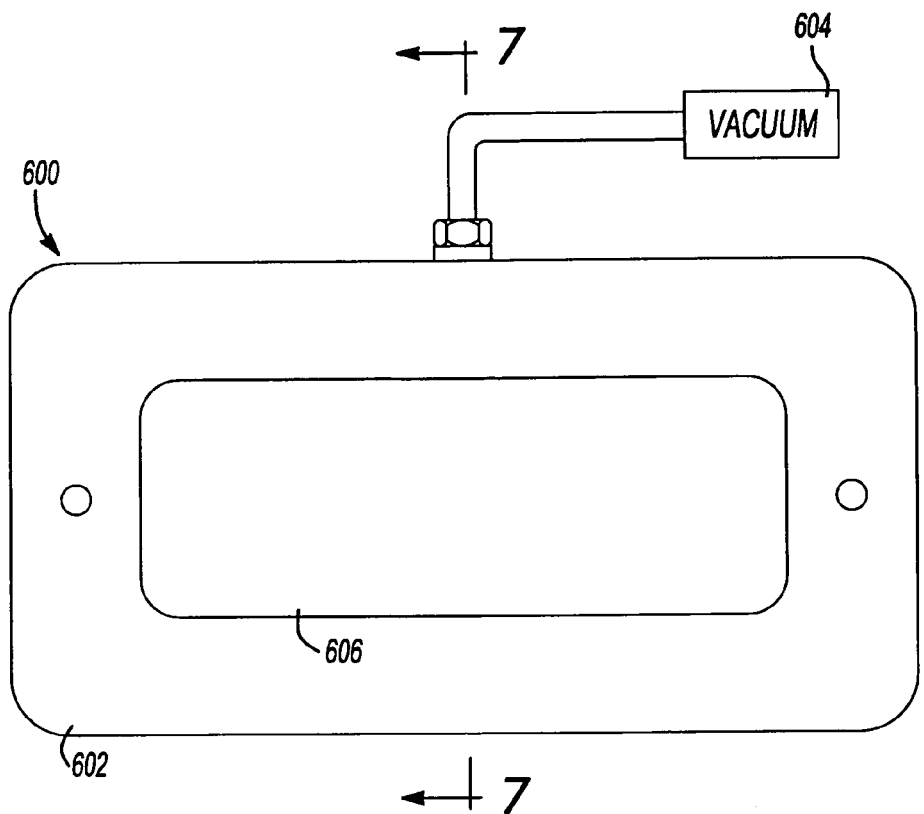
FIG. 6 is a plan view of an example vacuum platen for use in constructing the electro-dynamic loudspeaker of FIG. 1.
Figure 7:
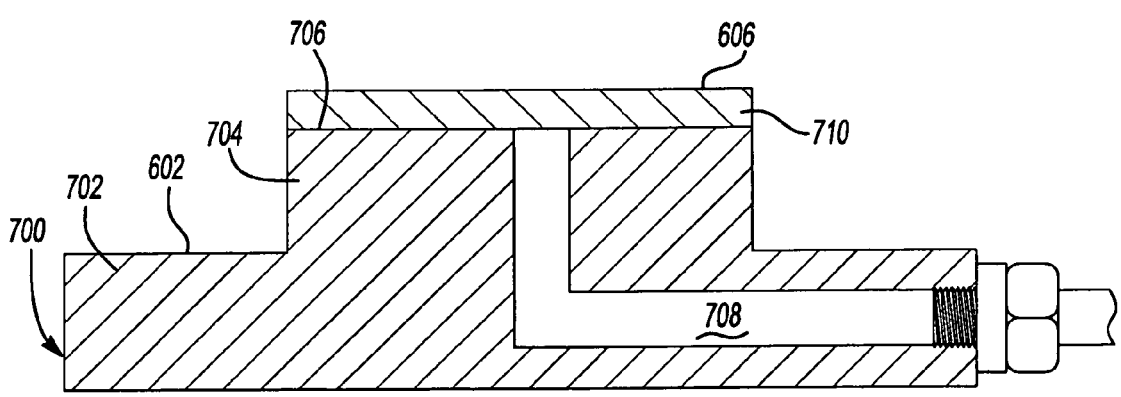
FIG. 7 is a cross-sectional side view of the vacuum platen shown in FIG. 6.
Figure 8:
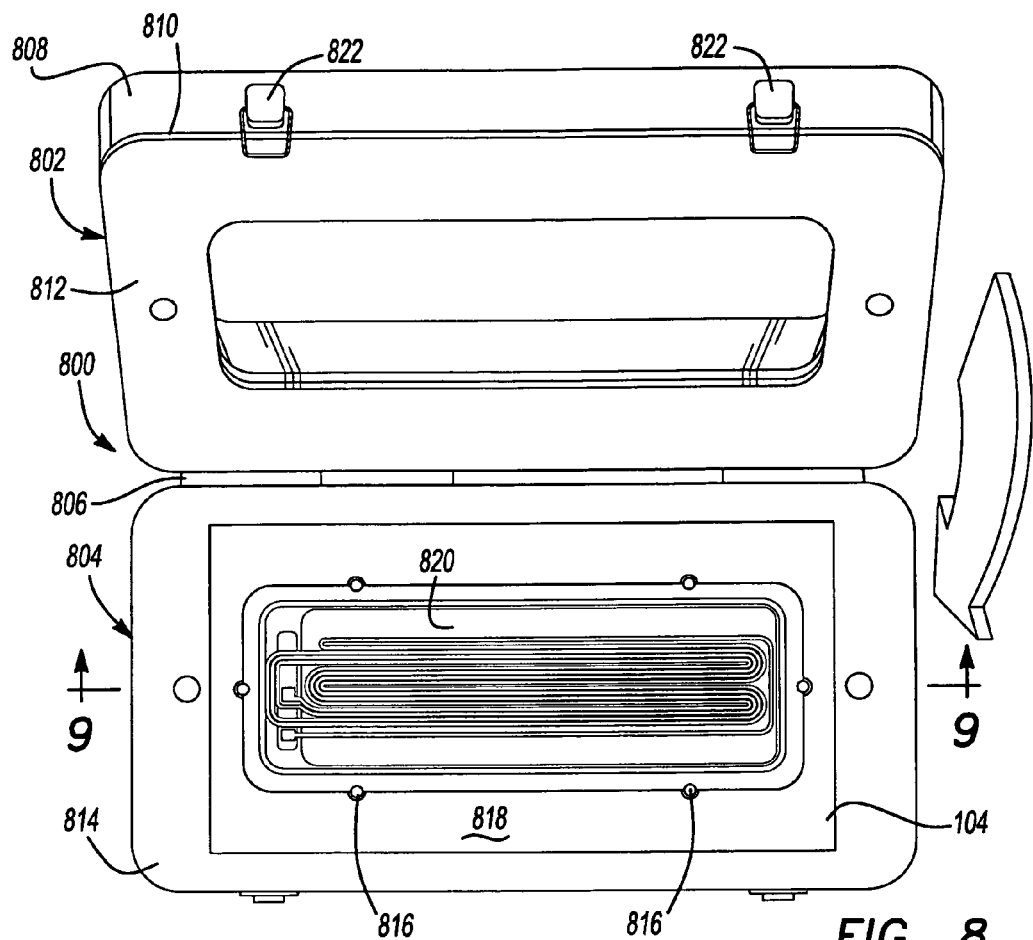
FIG. 8 is a perspective view of an example clamp assembly for use in constructing the electro-dynamic loudspeaker of FIG. 1.
Figure 9:
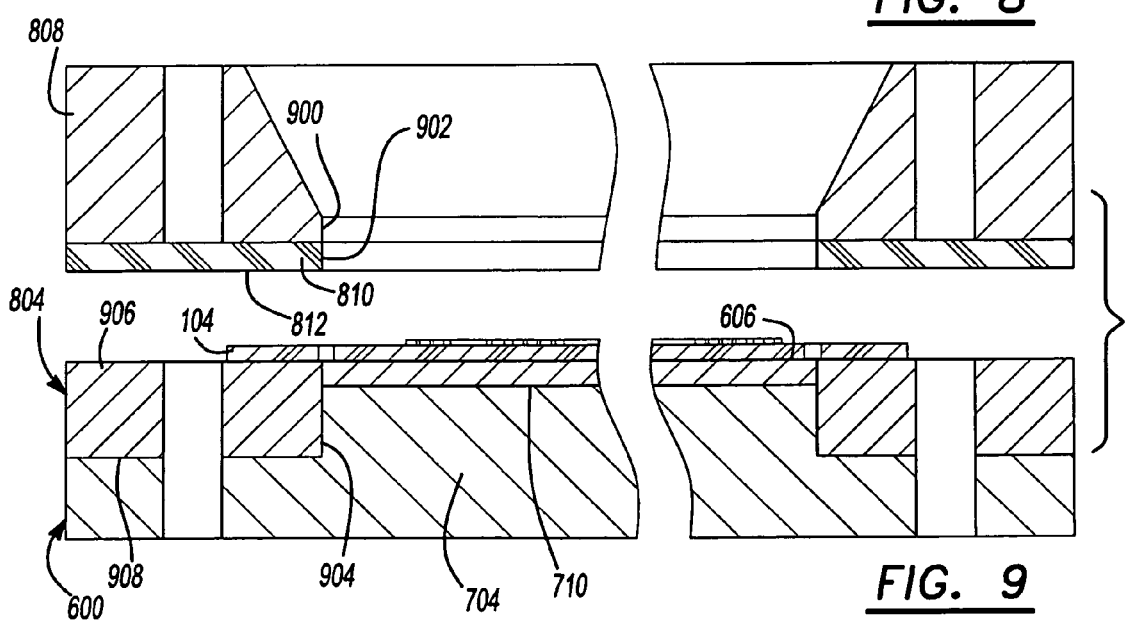
FIG. 9 is a cross-sectional side view of the clamp assembly of FIG. 8.

Various systems for assembling an example loudspeaker 100 will now be described. A first example system is depicted in FIGS. 5–17. The first system includes a vacuum platen 600 (FIGS. 6–7) and a film clamp 800 (FIGS. 8–9). Vacuum platen 600 and film clamp 800 may be used in conjunction with one another to restrain diaphragm 104 (FIG. 5) in a flat position without tension. Once diaphragm 104 is fixed within clamp 800, film 400 may be subsequently tensioned as will be described later.

The initial flattening and clamping of diaphragm 104 may provide the assembler with a known diaphragm state to which tension may be added. Difficulties may arise in attempting to obtain a reproducible tension during subsequent assembly operations when diaphragm 104 is not first placed in a substantially flat, no tension state. This first example system includes vacuum platen 600 and film clamp 800 to achieve a repeatable diaphragm state. In other examples, any other mechanism(s) and/or techniques capable of providing a known diaphragm state to which tension may be added may be used.

The example vacuum platen 600 includes a base 700 having a body 702 and a pedestal 704 protruding from a first surface 602 of body 702. Pedestal 704 includes an upper surface 706 positioned substantially parallel to first surface 602. A vacuum passageway 708 may extend through pedestal 704 and body 702 to couple upper surface 706 with a vacuum source 604. A cap 710 may be coupled to pedestal 704 along upper surface 706. Cap 710 may be constructed from a gas permeable material such as porous aluminum. Base 700 may be constructed from a gas impermeable material. Accordingly, a suction force is created along an upper surface 606 of cap 710 when vacuum source 604 draws a vacuum in vacuum passageway 708.

The example film clamp 800 includes an upper clamp half 802 and a lower clamp half 804 connected by a hinge 806. The illustrated upper clamp half 802 includes a generally rectangularly shaped body 808 and an elastomeric gasket 810. Body 808 includes an aperture 900 (FIG. 9) extending through body 808. Elastomeric gasket 810 includes a similarly shaped aperture 902 (FIG. 9) extending through the thickness of gasket 810. Elastomeric gasket 810 may be attached to body 808 to provide a compressible high friction surface 812 for engagement with diaphragm 104.

The illustrated lower clamp half 804 is constructed from a generally rectangularly shaped aluminum frame 814 having an aperture 904 extending through the lower clamp half 804. Lower clamp half 804 includes an upper surface 906 and a lower surface 908.

During the loudspeaker assembly process, film clamp 800 may be positioned on vacuum platen 600 such that pedestal 704 enters aperture 904 of lower clamp half 804 as illustrated in FIG. 9. Once seated, upper surface 906 of lower clamp half 804 may be substantially coplanar with upper surface 606 of cap 710. In order to properly position diaphragm 104, upper clamp half 802 may be rotated to place film clamp 800 in the open position depicted in FIG. 8.

With vacuum source 604 turned off, diaphragm 104 may be placed on upper surface 606. Diaphragm 104 may be aligned relative to lower clamp half 804 using sights 816. Sights 816 may be visual markings, rods, rings, notches or any other form of alignment mechanism formed on diaphragm 104 to assist in the alignment procedure. The location of sights 816 effectively defines a perimeter portion 818 and a center portion 820 of diaphragm 104. Center portion 820 may contain most, if not all, of the material which will remain coupled to frame 102 at the completion of the assembly process.

Figure 10:
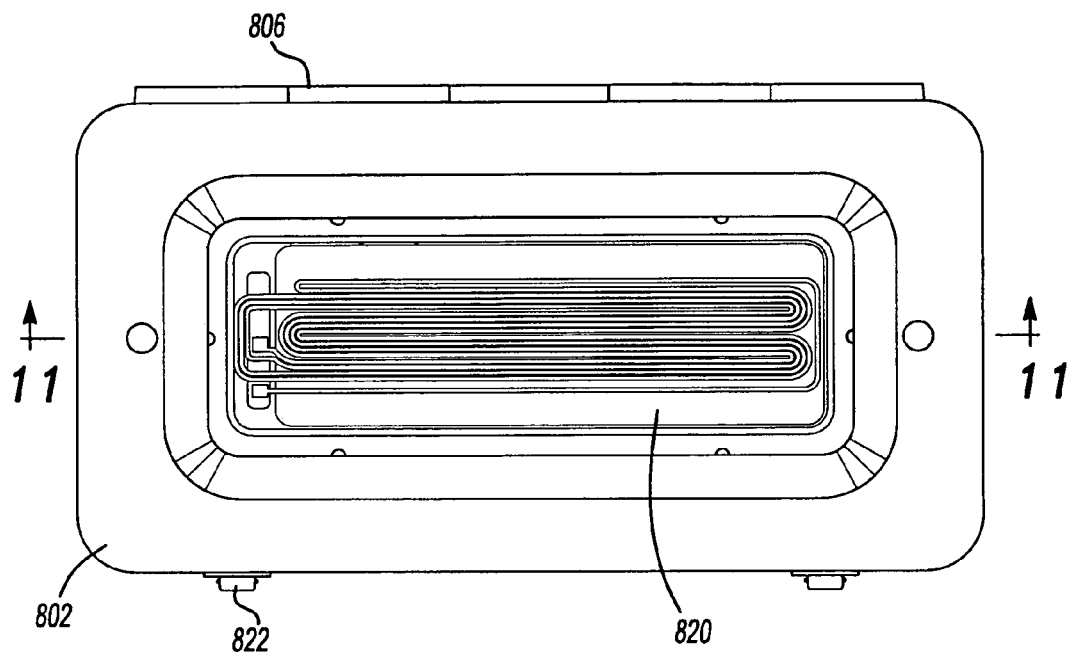
FIG. 10 is a plan view of the clamp assembly of FIG. 8 in a closed position.
Figure 11:
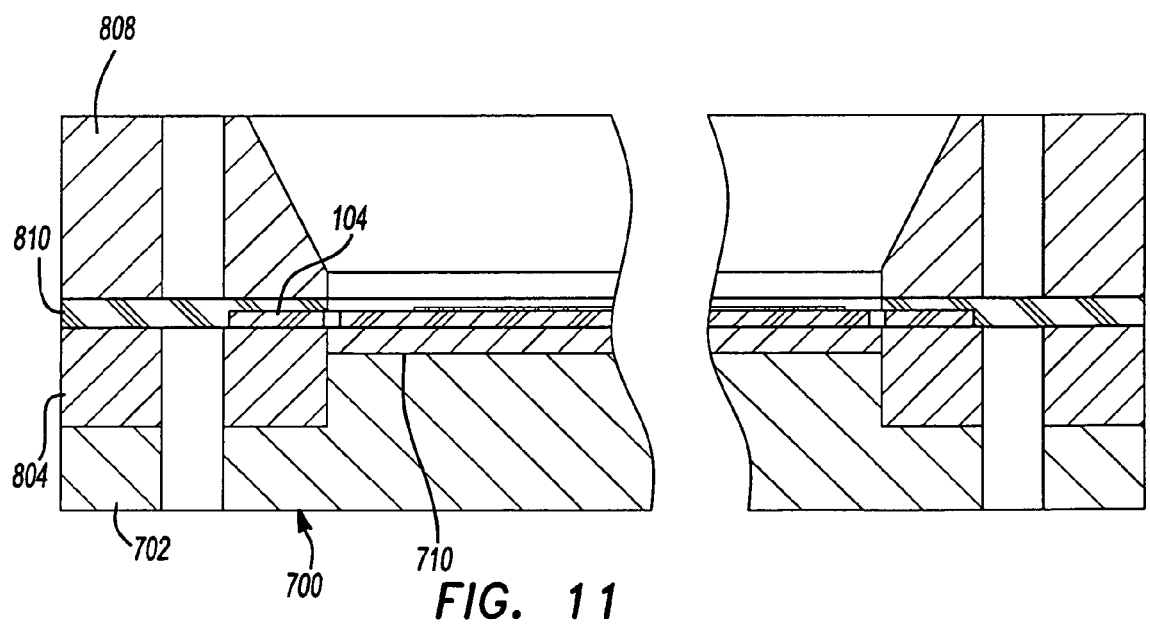
FIG. 11 is a cross-sectional side view of the clamp assembly of FIG. 8 in the closed position.

Once diaphragm 104 has been properly positioned, vacuum may be supplied to cap 710 via vacuum source 604. Because cap 710 is constructed from a gas permeable material, diaphragm 104 is forced to closely conform to planar upper surface 606. While the vacuum source is maintained, upper clamp half 802 may be rotated to place film clamp 800 in a closed position as shown in FIGS. 10 and 11. During clamp closure, elastomeric gasket 810 may deform locally to account for the thickness of diaphragm 104. Latches 822 secure upper clamp half 802 to lower clamp half 804. It should be appreciated that latches 822 are merely exemplary devices for coupling the clamp halves together and that any number of fastening devices may be implemented. Once upper clamp half 802 is clamped to lower clamp half 804, vacuum is turned off and film clamp 800 holding diaphragm 104 in an untensioned state is removed from vacuum platen 600.

Figure 12:
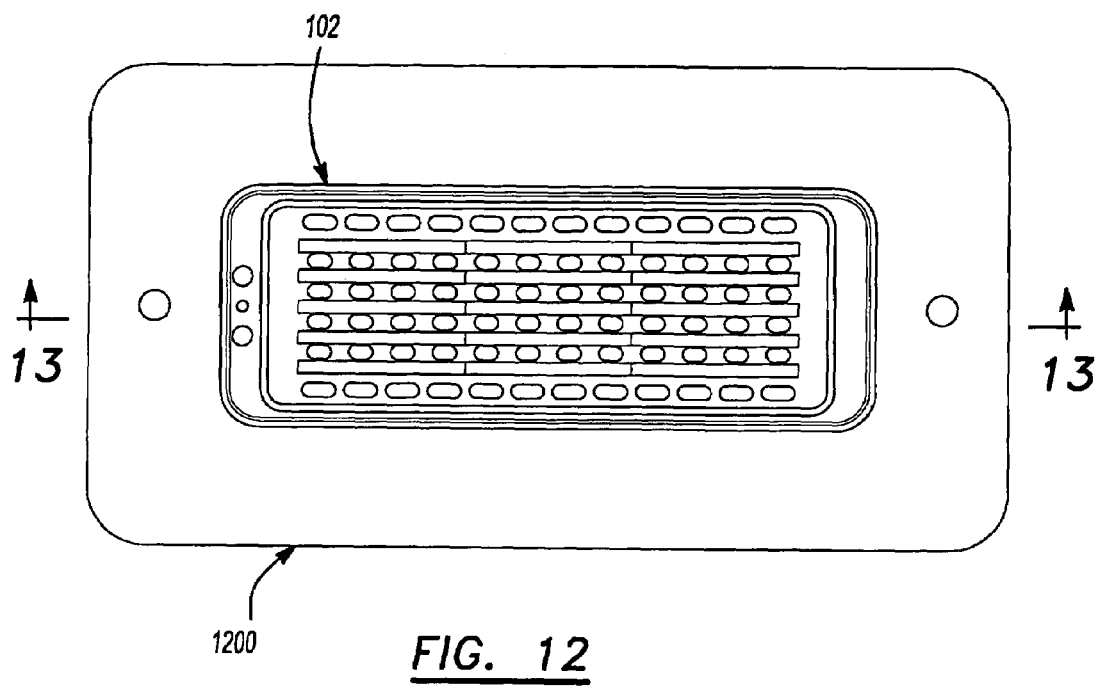
FIG. 12 is a plan view of an example assembly fixture with a frame of the electro-dynamic loudspeaker of FIG. 1 positioned on the assembly fixture.
Figure 13:
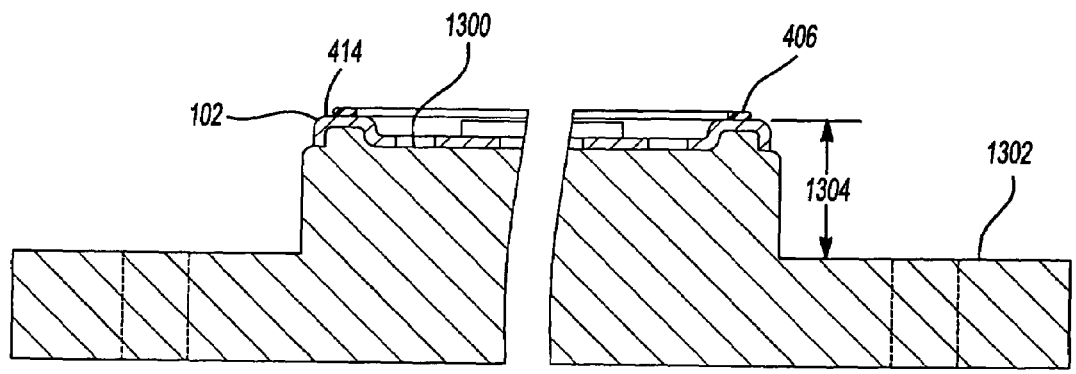
FIG. 13 is a cross-sectional side view of the assembly fixture and frame illustrated in FIG. 12.

Frame 102 may be fixtured in an example assembly fixture 1200 (FIGS. 12 and 13). Assembly fixture 1200 may be shaped substantially similarly to vacuum platen 600. However, assembly fixture 1200 may include a recess 1300 for receipt of a portion of frame 102. Assembly fixture 1200 includes a gage surface 1302 offset a predetermined distance 1304 from planar mounting surface 408 of frame 102. In order to apply tension to diaphragm 104, distance 1304 is greater than the thickness of lower clamp half 804. The magnitude of tension generated is optimized by defining distance 1304 in concert with the physical characteristics of frame 102 and diaphragm 104.

Figure 14:
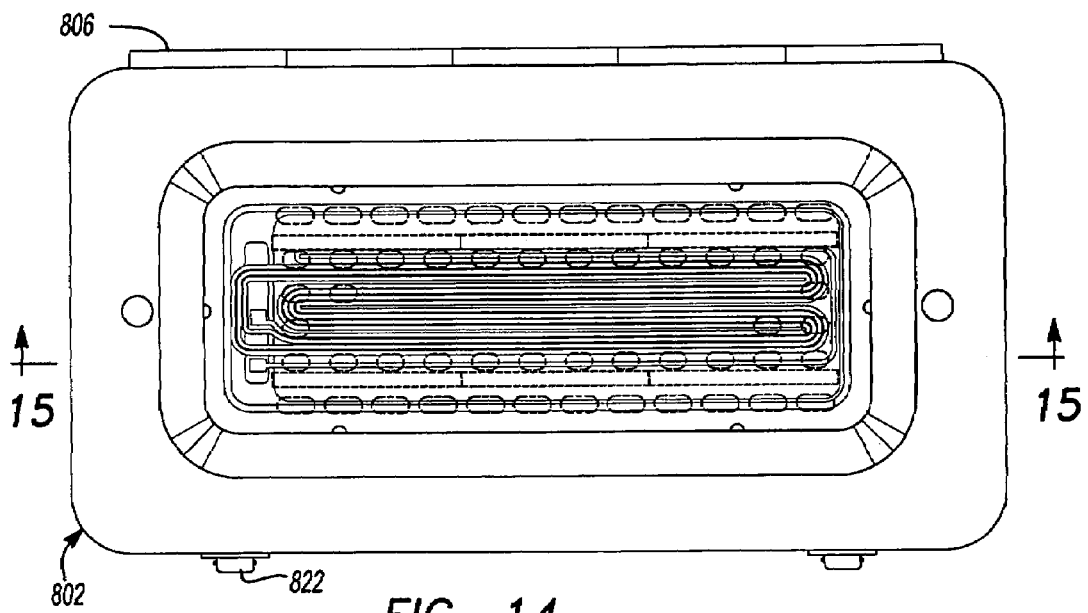
FIG. 14 is a plan view of the clamp assembly of FIG. 8 positioned on top of the assembly fixture of FIG. 12.
Figure 15:
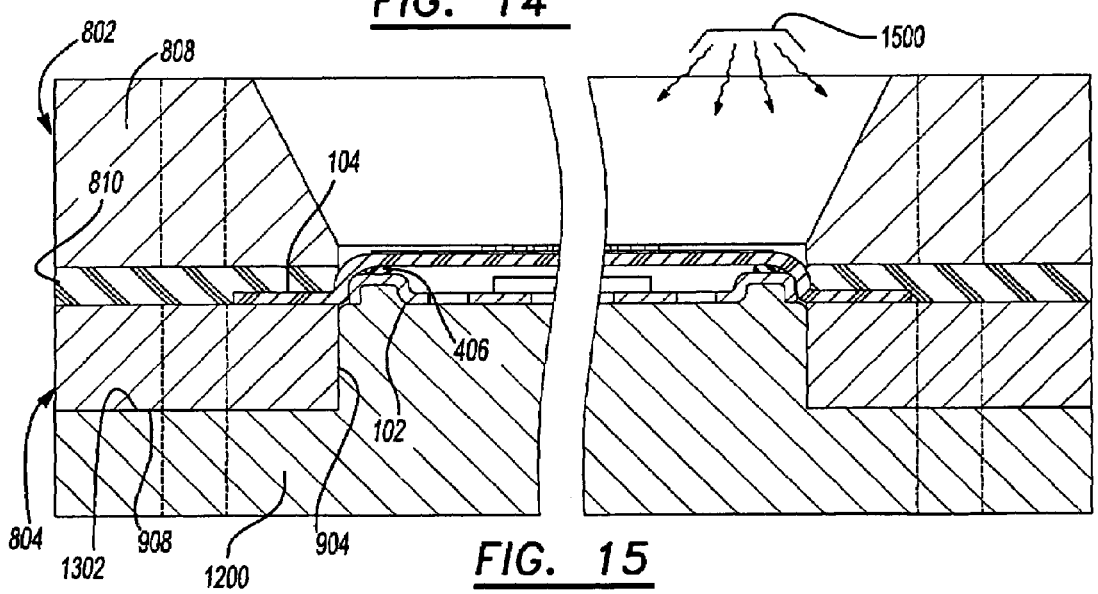
FIG. 15 is a cross-sectional side view of the closed clamp assembly of FIGS. 10 and 11 positioned on top of the assembly fixture of FIG. 12.

Diaphragm 104 may be mechanically coupled with frame 102. For example, adhesive 406 may be applied to planar mounting surface 408 of frame 102. Adhesive 406 may alternatively be applied to diaphragm 104. After application of adhesive 406, film clamp 800 including clamped diaphragm 104 may be positioned on assembly fixture 1200 such that frame 102 enters aperture 904 of lower clamp half 804 (FIGS. 14 and 15). The diaphragm 104 may contact adhesive 406 and planar mounting surface 408 of frame 102. Contact may occur prior to lower surface 908 of lower clamp half 804 contacting gage surface 1302 of assembly fixture 1200. To produce the desired tension in film 400, film clamp 800 is forced down over assembly fixture 1200 so that lower surface 908 engages gage surface 1302.

Depending on the type of adhesive used, a subsequent process may be required. For example, adhesive 406 is curable by exposure to radiation. Accordingly, while film clamp 800 is coupled to assembly fixture 1200, a radiation source 1500 is energized to cure the adhesive and secure diaphragm 104 to frame 102. Alternatively, where some other mechanical coupling mechanism is used, appropriate processes may need to be performed.

Figure 16:
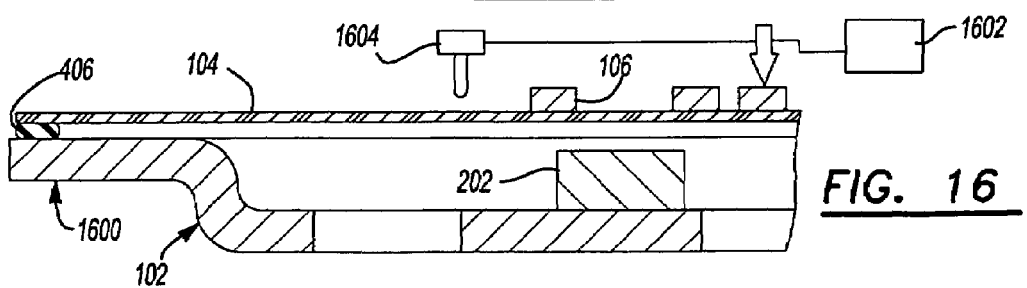
FIG. 16 is cross-sectional side view of an example work-in-process partially constructed electro-dynamic loudspeaker.

A second example system used to tension the diaphragm of a loudspeaker 100 is described with reference to FIGS. 16 and 17. In this system, frame 102 includes an elongated radially extending flange 1600 which does not include a downwardly extending lip. The remaining planar loudspeaker components are substantially similar to those previously described. The assembly process may include positioning diaphragm 104 in a substantially flat, no tension state as previously described. However, it should be appreciated that the flattening and clamping steps are not necessarily required to construct planar loudspeaker according to this system. Similarly, alternate tensioning methods that are described are not intended to be limited to include the flattening and clamping process.

A bead of adhesive 406 may be applied along the periphery of either or both frame 102 and diaphragm 104. Diaphragm 104 may then be aligned with and bonded to frame 102 via adhesive 406. As noted earlier, adhesive 406 may be a light curable material or any other suitable bonding agent which may affix the dissimilar materials to one another. Similarly, adhesive 406 may any other coupling mechanism to mechanically couple the diaphragm 104 to the frame 102.

Figure 17:
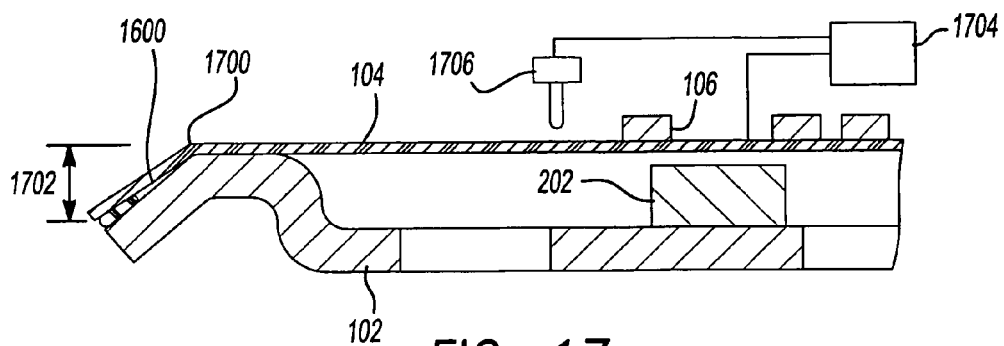
FIG. 17 is a cross-sectional side view of an example finished electro-dynamic loudspeaker.

Radially extending flange 1600 may be mechanically deformed by bending an outer peripheral region down from line 1700 as shown in FIG. 17 to tension diaphragm 104. Line 1700 acts as a fulcrum around the perimeter of frame 102 about which diaphragm 104 is stretched. The proper diaphragm tension may be obtained in a variety of ways. For example, if diaphragm 104 was initially coupled to frame 102 in a substantially flat, non-tension state, a deflection distance 1702 may be empirically determined by testing. Once the proper deflection distance is determined, hard tooling may be created to repeatably deform frame 102 and move radially extending flange 1600 the predetermined deflection distance 1702 during the assembly of each loudspeaker 100.

Another example system of assuring proper film tension includes a feedback system 1602. One example feedback system may involve placing a known load at the center of diaphragm 104 and measuring the deflection of the diaphragm at the load application point. The desired deflection per load may be empirically determined by testing where the resonance frequency of diaphragm 104 is plotted against deflection per a given load. Once the desired resonance frequency is determined for a given speaker geometry, a target diaphragm deflection per given load may be determined. The feedback system may operate by measuring the actual diaphragm deflection at a known load with a deflection sensor 1604. The measured actual deflection may be compared to the target deflection.

Frame 102 may be deformed until the measured deflection is substantially equal to the target deflection, thereby properly tensioning diaphragm 104 to produce the desired resonance frequency. Logic control systems such as proportional, integral, derivative closed feedback loops, etc. may be implemented to control the mechanical deflection of frame 102 during the tensioning process. Such a control system may provide a high degree of repeatability regarding film tensioning.

Another example feedback system 1704 may directly measure resonance frequency during film tensioning using a frequency sensor 1706. In this control scheme, diaphragm 104 may be repeatedly excited and the resonance frequency measured. The measured frequency may be compared to a desired target frequency during film tensioning. Frame 102 may be deformed until the measured resonance frequency matches the target frequency within an acceptable tolerance. It should be appreciated that the feedback systems described may be used with any of the tensioning techniques described.

Yet another film tensioning system will be described in greater detail with reference to FIG. 18. An example film tensioner 1800 includes an upper plate 1802 and a lower plate 1804. Plates 1802 and 1804 have matching beveled apertures 1806 and 1808, respectively. Center portion 820 of diaphragm 104 is positioned within the openings defined by apertures 1806 and 1808. Apertures 1806 and 1808 may be sized and shaped slightly larger than frame 102 to allow insertion of frame 102 within one of the apertures 1806 and 1808.

Figure 18:
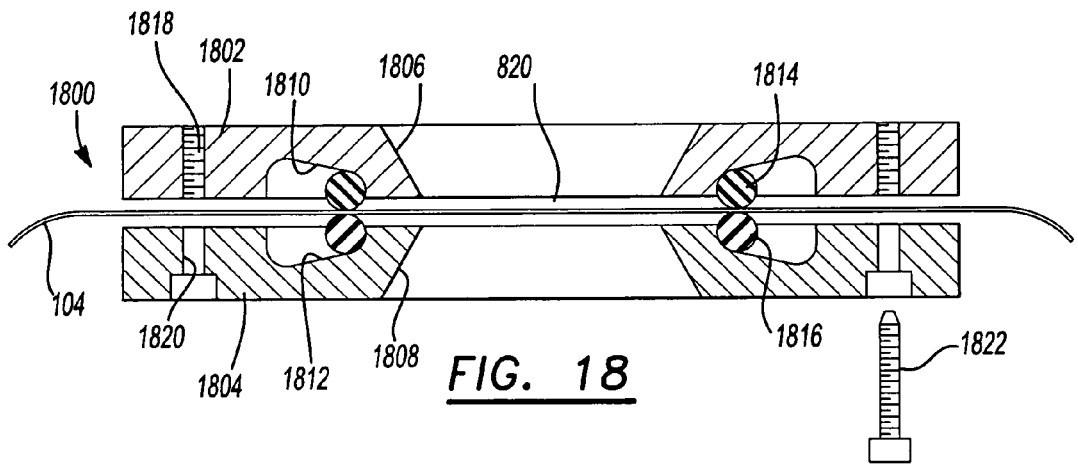
FIG. 18 is a cross-sectional view of an example film tensioning device.

Upper plate 1802 may include an annular groove 1810 having an asymmetrical cross-section as shown in FIG. 18. Lower plate 1804 may include an annular groove 1812 shaped as the mirror image of groove 1810. A first elastomeric member 1814 may be positioned within groove 1810 and a second elastomeric member 1816 may be positioned within groove 1812. Grooves 1810 and 1812 may be shaped to constrain movement of the elastomeric members 1814 and 1816 toward apertures 1806 and 1808, respectively. In addition, grooves 1810 and 1812 may be shaped to allow movement of elastomeric members 1814 and 1816 away from apertures 1806 and 1808. Specifically, the annular grooves 1810 and 1812 may be shaped to impart a lateral force to center portion 820 of diaphragm 104 when an axial force is applied to upper plate 1802 and lower plate 1804 drawing them toward one another.

Upper plate 1802 may also include threaded apertures 1818. Stepped apertures 1820 extend through lower plate 1804. Threaded fasteners 1822, which are illustrated as bolts, may be inserted in apertures 1820 and tightened into threaded apertures 1818 to draw upper plate 1802 and lower plate 1804 together. It should be appreciated that upper plate 1802 and lower plate 1804 may be drawn together using a variety of mechanisms such as toggle clamps, jack screws, hydraulic cylinders or any other known clamping and force producing devices.

In this example technique, the film may first be tensioned by drawing upper plate 1802 and lower plate 1804 together. Adhesive 406 (or some other coupling mechanism) may be placed on the tensioned portion of diaphragm 104 and/or planar mounting surface 408 of frame 102. While upper plate 1802 is clamped to lower plate 1804, frame 102 may be placed into contact with diaphragm 104. Once the adhesive has cured (or mechanical coupling completed), the threaded fasteners 1822 may be removed and upper plate 1802 may be separated from lower plate 1804. It should also be appreciated that apertures 1806 and 1808 may be sized to allow entry of light waves to cure adhesive 406, or to allow manipulation of some other coupling mechanism, if so desired. Depending on the specific configuration of the loudspeaker 100, perimeter portion 818 of diaphragm 104 may be trimmed to remove any film extending beyond lip 306.

Figure 19:
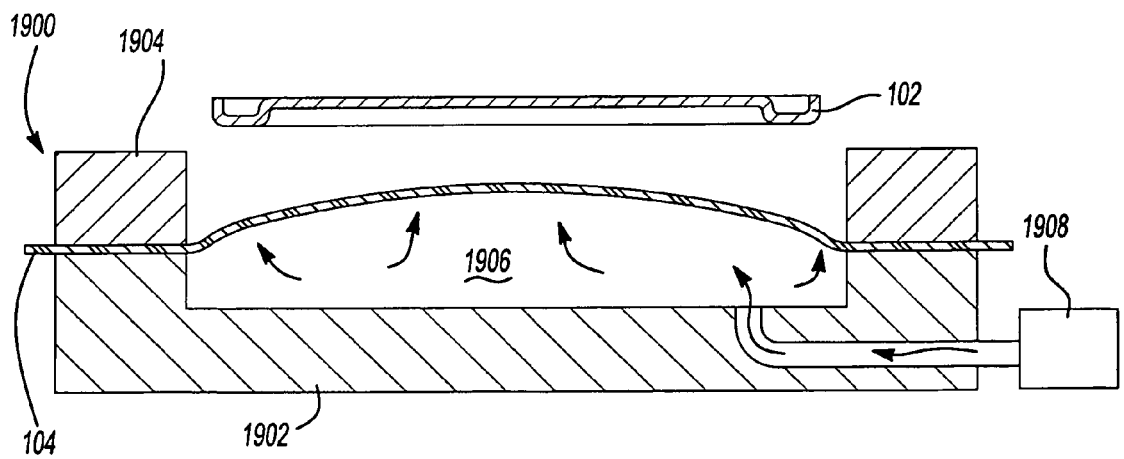
FIG. 19 is a cross-sectional side view of another example film tensioning device.

With reference to FIG. 19, another example film tensioning technique is depicted. The fixturing used to practice this example technique includes a fixture 1900 having a lower die 1902, and an upper die 1904. Fixture 1900 may function to restrain the periphery of diaphragm 104 and define a cavity 1906 between one side of the diaphragm 104 and lower die 1902. A fluid source 1908 may supply pressurized fluid to cavity 1906. Because lower die 1902 is constructed from a substantially rigid material, diaphragm 104 may elongate in tension as depicted in FIG. 19. Pressure is maintained within cavity 1906 while frame 102 is mechanically coupled with diaphragm 104. Diaphragm 104 may be secured to frame 102 using any number of previously discussed bonding techniques including mechanical fasteners, radiation curable adhesives, multi-part epoxies, heat curable adhesives or pressure sensitive compounds.

After diaphragm 104 has been fixed to frame 102, upper die 1904 may be removed. If desired, excess diaphragm material extending beyond the perimeter of frame 102 may be removed.

In this example technique, some of the initial tension generated by the pressurized fluid may relax during subsequent frame attachment process. Accordingly, a tension greater than the final desired tension may be initially induced via fluid source 1908 to assure that the film is properly tensioned during use.

Figure 20:
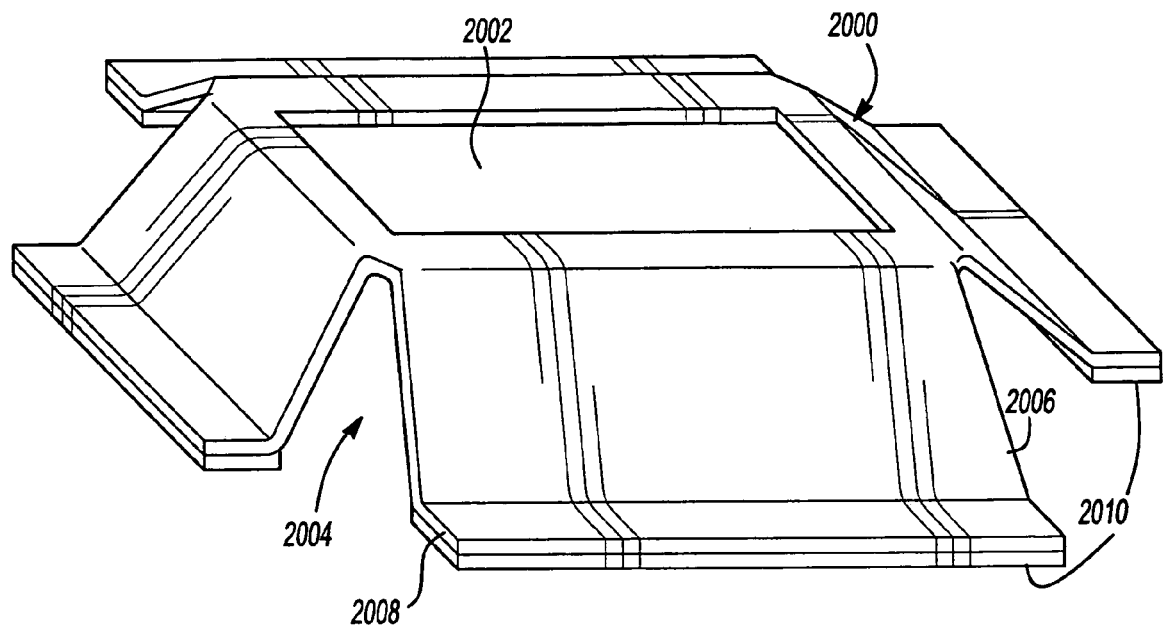
FIG. 20 is a perspective view of yet another example film tensioning device.
Figure 21:
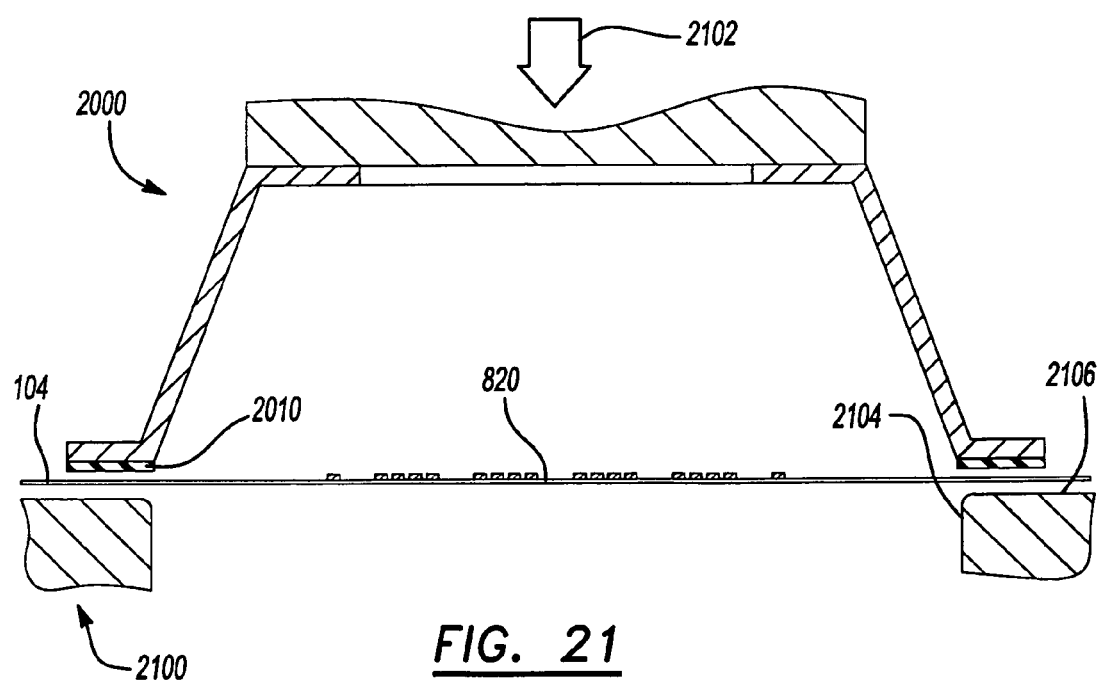
FIG. 21 is a cross-sectional side view depicting use of the alternate tensioning member shown in FIG. 20.
Figure 22:
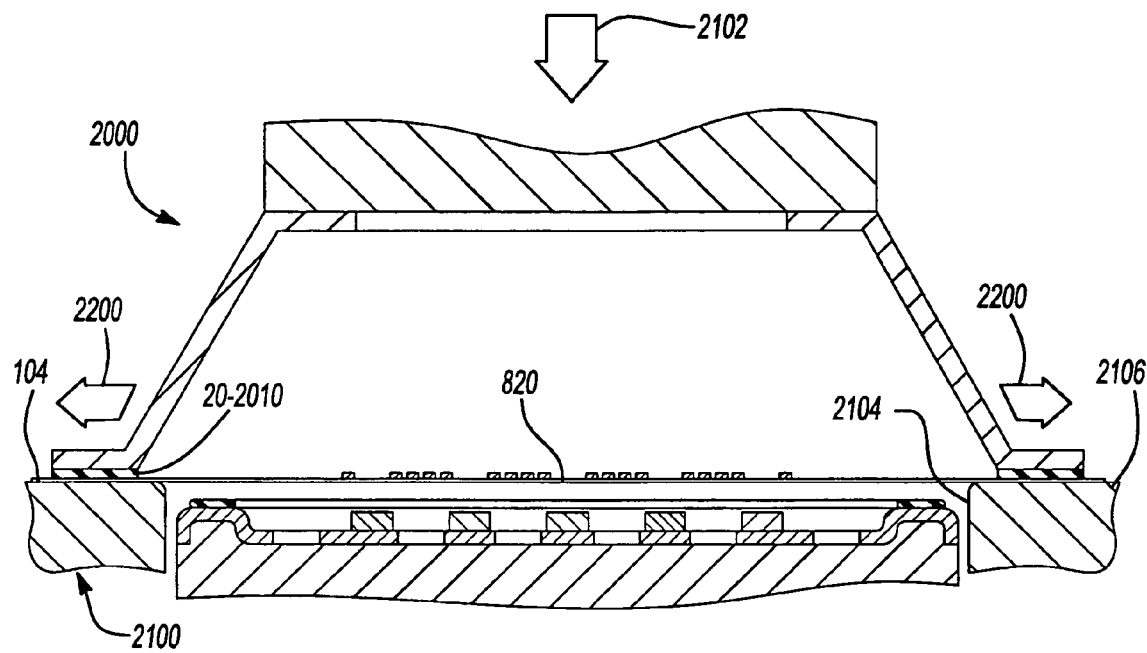
FIG. 22 is a cross-sectional side view further depicting diaphragm tensioning using the tensioning device shown in FIG. 20.

FIGS. 20–22 depict another example of fixturing used to tension diaphragm 104 prior to attaching diaphragm 104 to frame 102. An example spider 2000 may operate in conjunction with an example base plate 2100 to tension diaphragm 104. Spider 2000 may be placed on a first side of diaphragm 104 while base plate 2100 may be placed on the opposite side of the diaphragm 104. Spider 2000 may function by converting an axial force applied in direction 2102 to a lateral tension produced in opposed directions 2200.

The illustrated spider 2000 is a generally pyramidal member having a hub 2002 positioned proximate to a truncated portion of the pyramid. A plurality of legs 2004 angularly extend from hub 2002. Each of the legs 2004 include a body portion 2006 and a foot portion 2008. Each foot portion 2008 radially extends from the distal end of each leg 2004. A pad 2010 is coupled (as shown in FIG. 20) to a lower surface of each foot 2008. Pads 2010 may be constructed from a high friction, elastomeric material that is suitable for gripping diaphragm 104 without causing damage to diaphragm 104.

The illustrated base plate 2100 is a generally rectangularly-shaped member having an aperture 2104 extending through the base plate 2100. Aperture 2104 may be shaped similarly to the perimeter of frame 102 and sized such that frame 102 may be inserted into aperture 2104. Base plate 2100 includes a low friction surface 2106 upon which diaphragm 104 may freely slide. As best shown in FIG. 21, each pad 2010 is supported by a portion of base plate 2100.

During tensioning, diaphragm 104 may be placed between base plate 2100 and spider 2000. An axial force may be applied to spider 2000 in direction 2102. Due to the angular orientation of legs 2004 relative to low friction surface 2106, at least some of the axial force applied in direction 2102 may be converted to opposing forces in opposed directions 2200. The opposed forces may tension diaphragm 104. After tensioning, frame 102 is mechanically coupled to diaphragm 104 as previously discussed.

Figure 23:
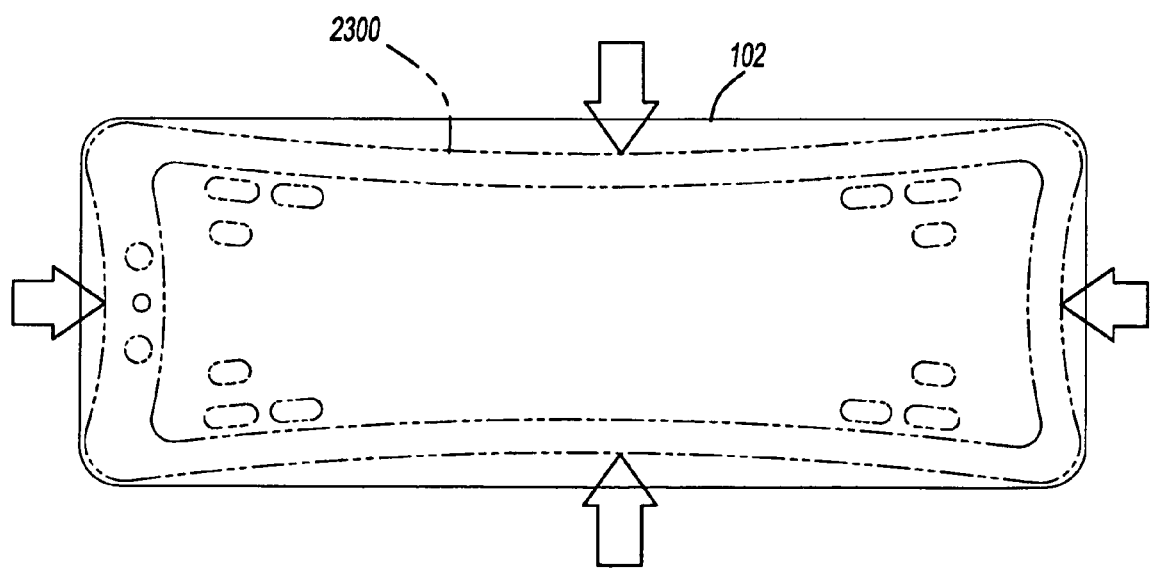
FIG. 23 depicts an example frame in an undeformed state and a deformed state.

FIG. 23, is yet another example system for loudspeaker 100 assembly. In this system, frame 102 may be elastically deformed prior to attachment of diaphragm 104. The deformed frame 102 is represented in phantom lines at reference numeral 2300. It should be appreciated that any number of force generating devices or tools such as jack screws, hydraulic rams or other force producing devices may be used to elastically deform frame 102 by inwardly deflecting radially extending flange 304 and lip 306 (FIG. 3) of frame 102. Frame 102 may be maintained in the deformed state shown as 2300 while diaphragm 104 (FIG. 1) is attached to planar mounting surface 408 (FIG. 4).

Once diaphragm 104 has been securely attached to frame 102, the external forces deforming frame 102 may be released. Because frame 102 was elastically deformed, flange 304 and lip 306 have a tendency to spring-back to their originally undeformed state. This tendency is resisted by diaphragm 104. Diaphragm 104 elongates as the deformed frame attempts to return to its undeformed state until an equilibrium is reached. Frame 102 may be constructed from steel, aluminum or any number of composite materials capable of being deformed. Materials having a modulus of elasticity less than 29,000 KSI are contemplated to provide a relatively large elastic deformation prior to yield. A large frame deformation is beneficial to account for elongation or deformation of adhesive 406 or other mechanical coupling used to bond diaphragm 104 to frame 102.

Figure 24:
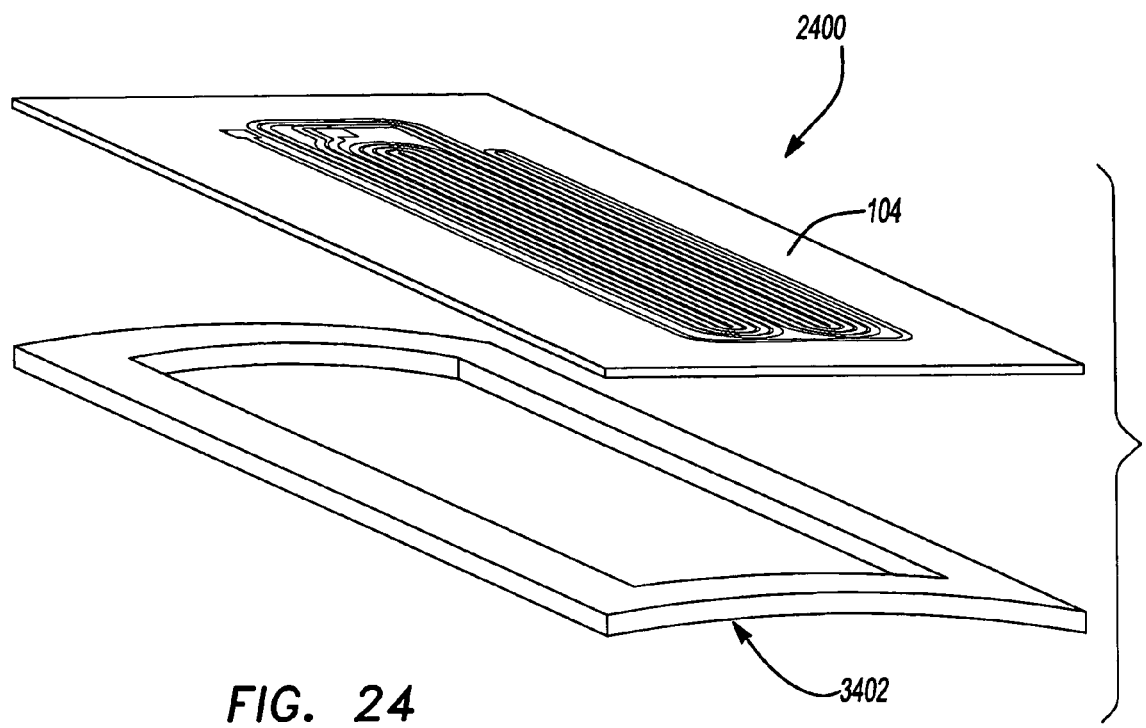
FIG. 24 is an exploded perspective view of another example loudspeaker.

Frames constructed from molded plastic or composite materials offer additional opportunities to incorporate an arc or a bow across a frame as depicted in FIG. 24. In illustrated example, a loudspeaker 2400 includes a bowed frame 2402. Frame 2402 may function as a spring washer to tension diaphragm 104.

During assembly of loudspeaker 2400, frame 2402 may be forced to a substantially planar condition. Diaphragm 104 may be coupled to frame 2402 while frame 2402 is in the substantially flat planar condition. Once diaphragm 104 has been securely attached to frame 2402, the external force maintaining frame 2402 in a substantially flat planar condition may be released. Because frame 2402 is elastically deformed, the frame has a tendency to return to the bowed shape. This tendency is resisted by diaphragm 104. Diaphragm 104 may elongate as frame 2402 attempts to return to the originally bowed shape until an equilibrium is reached. At equilibrium, diaphragm 104 is in a tensioned state and no further movement of diaphragm 104 and/or frame 2402 occurs.

Figure 25:
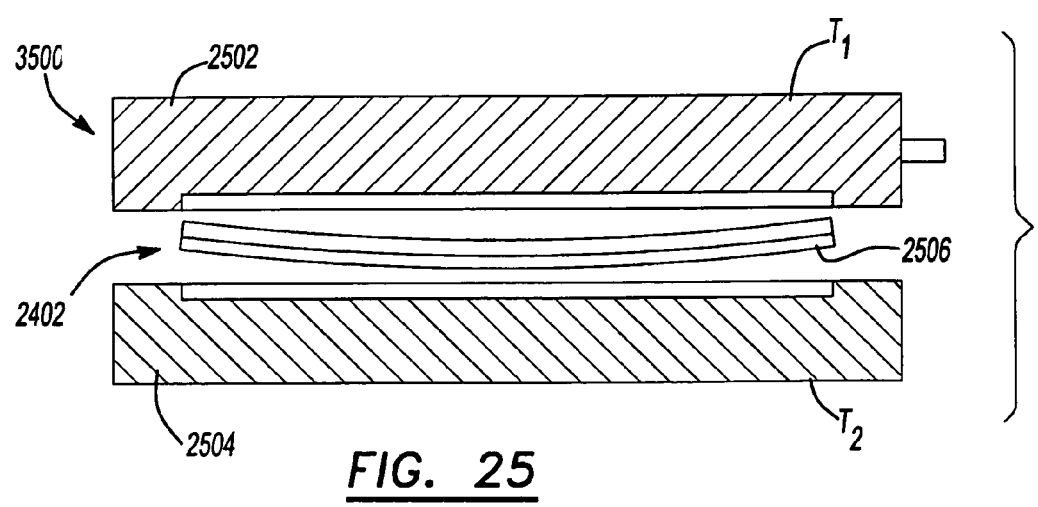
FIG. 25 is a cross sectional view of an injection mold used to construct an example bowed frame of the loudspeaker depicted in FIG. 24.

The bowed frame 2402 may be created using injection molding equipment such as that shown in FIG. 25. An example injection mold 2500 includes an upper mold half 2502 and a lower mold half 2504. A parting line 2506 runs along the length of frame 2402. The position of parting line 2506 is defined by the interface position of upper mold half 2502 and lower mold half 2504. The arc or bow may be created by imparting a temperature differential between first mold half 2502 and second mold half 2504. The use of a differential mold temperature to bow the frame 2402 will conceptually work for all molding resins. However, semi-crystalline resins such as Polybutylene Terephthalate (PBT), Polyethylene Terephthalate (PET), nylons, Polypropylene (PP) and blends incorporating these materials will produce an especially pronounced bow.

Alternatively, bowed frame 2402 may be produced from a mold having curved cavity surfaces. Standard temperature control techniques may then be used. In another alternative, both concepts may be used in combination. Specifically, a mold having curved surfaces may be controlled to maintain mold half temperature differentials and obtain the desired bowed frame 2402.

Figure 26:
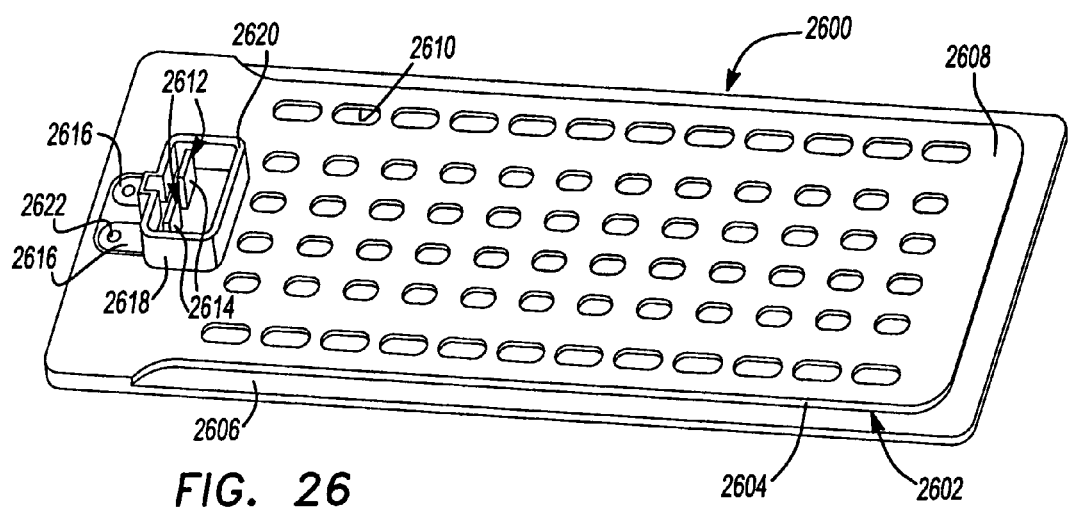
FIG. 26 is a perspective bottom view of an example plastic frame of a loudspeaker.
Figure 27:
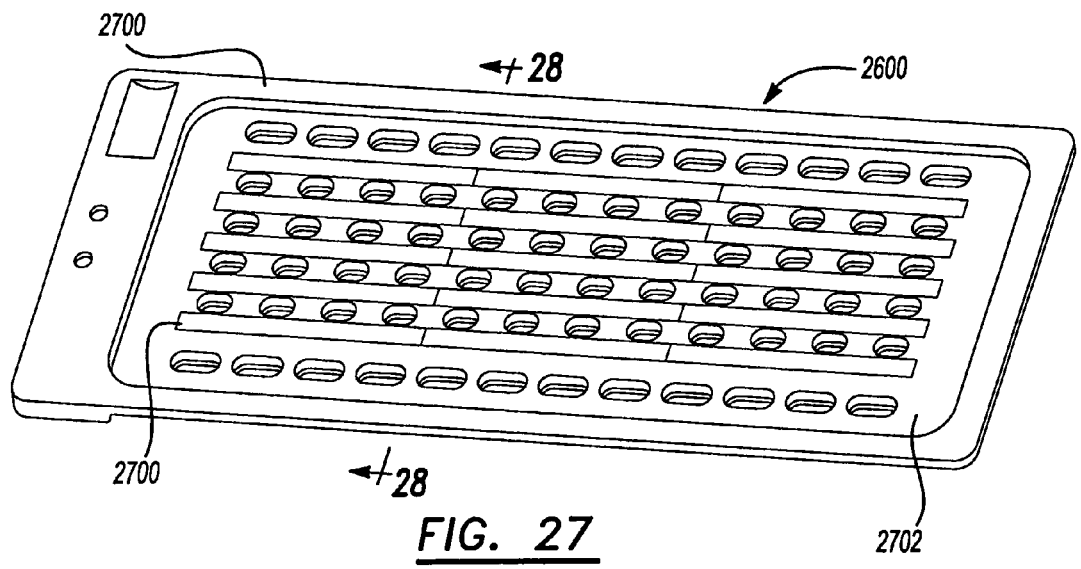
FIG. 27 is a perspective top view of the frame illustrated in FIG. 26.

With reference to FIGS. 26 and 27, another example frame 2600 is shown. FIG. 26 depicts the bottom of frame 2600 while FIG. 27 shows the top of frame 2600. Frame 2600 may be constructed from a reinforced plastic or other similar material. The illustrated frame 2600 is a generally dish-shaped member having a base 2602 surrounded by a wall 2604 extending substantially orthogonally from the base 2602. Wall 2604 terminates at a radially extending flange 2606 which defines a substantially planar mounting surface 2700. During assembly, diaphragm 104 (FIG. 1) is coupled to frame 2600 along planar mounting surface 2700. Base 2602 includes a first surface 2702, a second surface 2608 and a plurality of apertures 2610 extending through the base 2602. Apertures 2610 are positioned and sized to provide the desired passageways for air positioned between first surface 2702 and diaphragm 104 to flow.

Figure 28:
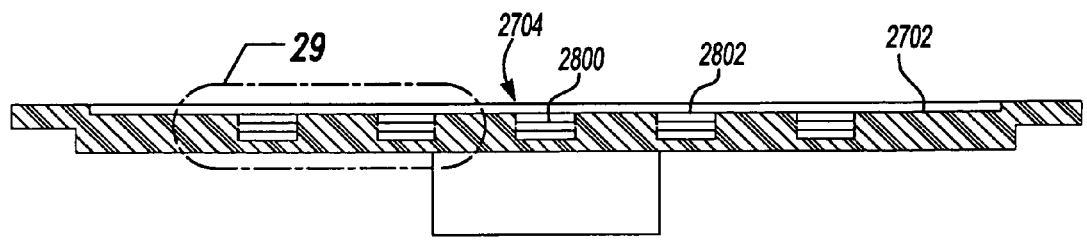
FIG. 28 is a cross-sectional view of the frame illustrated in FIG. 27 taken along line 28—28.
Figure 29:
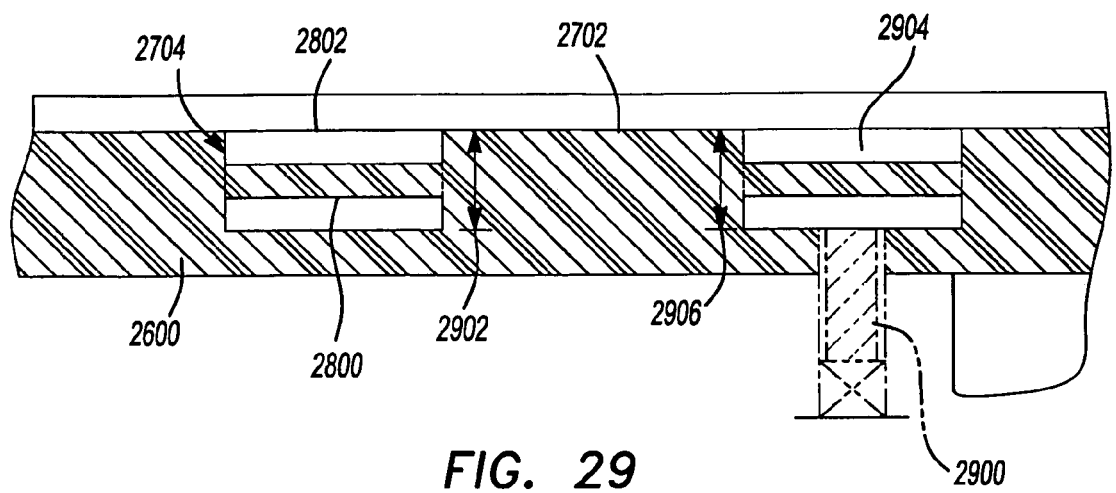
FIG. 29 is an enlarged partial cross-sectional view of an example magnet assembly and the plastic frame depicted in FIG. 26.

A plurality of magnets 2704 may be integrally molded within frame 2600. As best shown in FIG. 28, each of magnets 2704 may include a slot 2800 extending transversely across each end of magnet 2704. FIG. 29 depicts an example of slots 2800 filled with the composite material of frame 2600 after an over-molding process has been completed. Accordingly, slots 2800 may perform a retention function to fix each of magnets 2704 within frame 2600. Each magnet 2704 may include an upper surface 2802 positioned coplanar with surface 2702 of frame 2600. Because magnets 2704 are recessed within base 2602, the overall height of frame 2600 may be reduced to provide a low-profile frame and loudspeaker assembly.

Additionally, the embedded magnet design may provide economic benefits related to magnets 2704. Magnets mounted to a steel frame have closely controlled thicknesses to assure that the upper surface of each magnet is positioned at a proper distance from diaphragm 104. As previously discussed, surfaces 2802 of magnets 2704 are designed to be substantially co-planar with surface 2702 of frame 2600.

During molding, the magnets 2704 may be placed on a spring loaded tool 2900 (shown in phantom line in FIG. 29) to align each upper surface 2802 of magnets 2704 with each other in substantially a single plane. The magnets 2704 are placed substantially in a single plane to generally maintain a uniform distance from the diaphragm 104 (FIG. 1). Because injected resin may flow around the magnets 2704 and the spring loaded tool, the thicknesses of magnets 2704 need not be closely controlled. For example, FIG. 29 depicts a first magnet 2704 having a first thickness 2902. A second magnet 2904 has a different thickness 2906. The variation in magnet thickness is accommodated within the body of frame 2600. A cost savings results by using magnets having a greater tolerance on the thickness dimension.

As best shown in FIG. 26, a pair of example electrical terminals 2612 may be over-molded within frame 2600. Accordingly, electrical terminals 2612 are partially embedded within frame 2600. Each electrical terminal 2612 includes a male prong portion 2614 and an end portion 2616. An intermediate portion positioned between male prong portion 2614 and end portion 2616 is embedded within frame 2600. Male prong portion 2614 may extend away from the body of frame 2600. A socket 2618 may be integrally molded with frame 2600. Socket 2618 includes a wall 2620 extending from surface 2608. Wall 2620 may surround male prong portions 2614 and may be shaped to mate with a female plug (not shown). The female plug may be used to electrically couple the loudspeaker 100 to a power source.

Each end portion 2616 may include an aperture 2622 extending through the end portion 2616. Apertures 2622 may also extend through flange 2606. After diaphragm 104 is coupled to mounting surface 2700, an electrical connection may be made between end portions 2616 and conductor 106 of diaphragm 104 by coupling electrically conducting jumpers or fasteners (not shown) to end portions 2616 and conductor 106.

Figure 30:
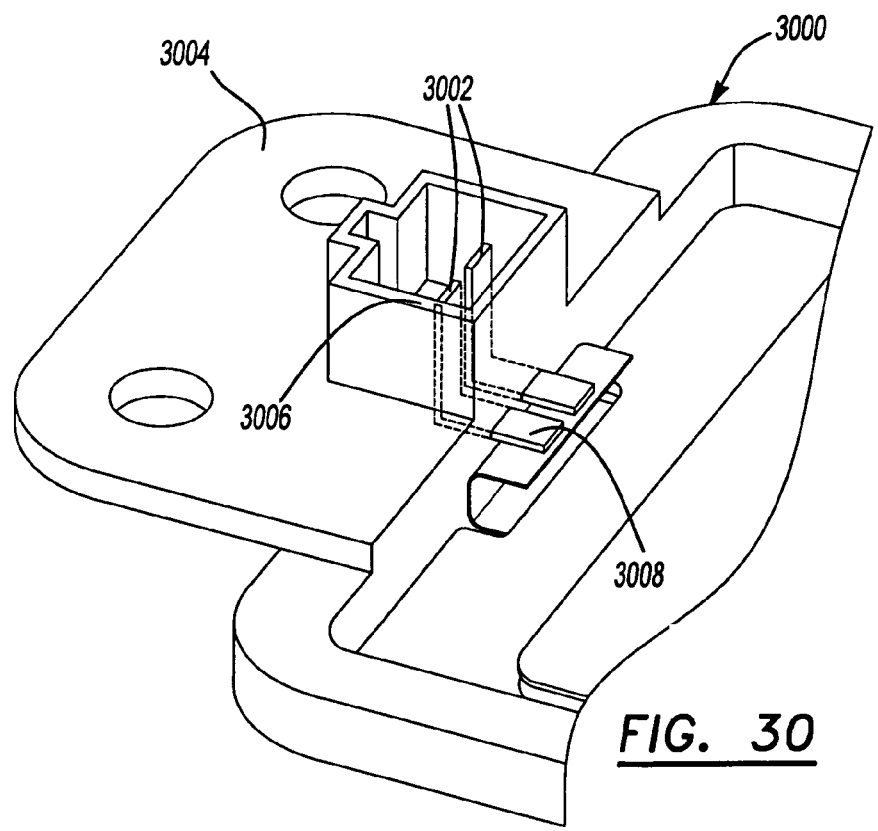
FIG. 30 is a partial perspective view of a terminal detail of an example plastic frame and an example magnet assembly.

With reference to FIG. 30, another example frame 3000 is depicted. Frame 3000 includes an example pair of electrical terminals 3002 molded within an example frame 3004. Each electrical terminal 3002 includes male prong portions 3006, intermediate portions 3007 and end portions 3008. Intermediate portion 3007 is embedded within frame 3000 between male prong portions 3006 and end portion 3008. Inwardly extending end portions 3008 may be electrically coupled with conductor 106 of diaphragm 104 after diaphragm 104 has been coupled to frame 3004. Electrical coupling may be by soldering, connectors, frictional contact or any other mechanism for electrically connecting electrical terminals 3002 with conductor 106.

Figure 41:
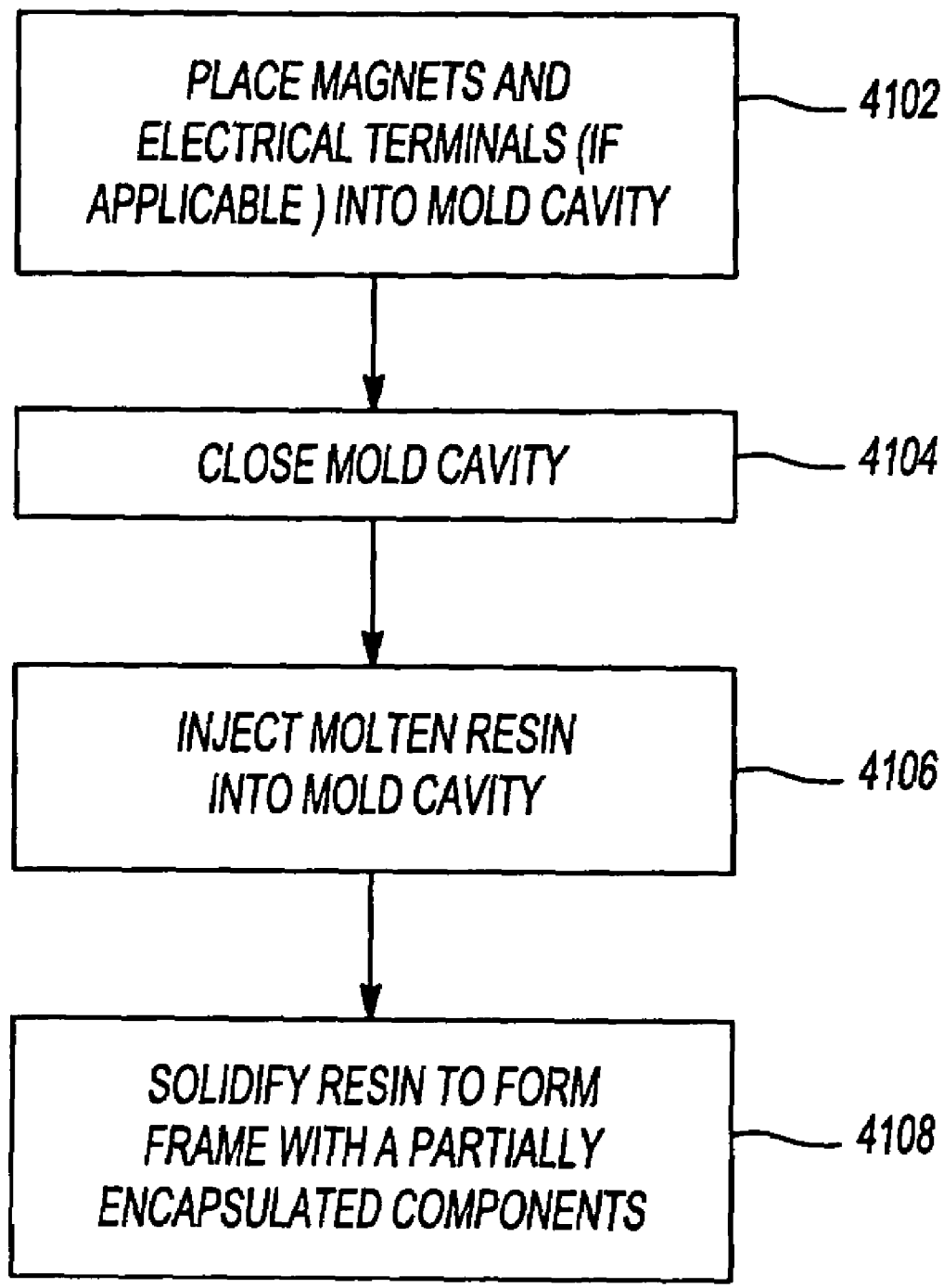
FIG. 41 is a flow diagram depicting a method of constructing an electro-dynamic loudspeaker.

To construct the example frames 2600 and 3000 having the integrally molded metallic components as previously discussed with reference to FIGS. 26, 27 and 30, an overmolding technique may be used. FIG. 41 depicts the process of constructing an electro-dynamic loudspeaker having a frame similar to frame 2600 or frame 3000. Magnets 2704 and electrical terminals 2612 may first be placed within an open injection mold cavity at step 4102. Magnets 2704 and electrical terminals 2612 may be positioned within the mold to assure that molten plastic resin covers at least a portion of each metallic component to retain each metallic component within frame 2600. The injection mold may also include features to mask off portions of the metallic components so selected portions are not contacted by molten plastic resin. The mold is closed at step 4104. Molten resin may be injected to fill the cavity during step 4106. Upon completion of this process, the resin is solidified at step 4108 and magnets 2704 and electrical terminals 2612 are fixed within frame 2600. Magnets 2704 and electrical terminals 2612 include exposed surfaces for the purpose previously described.

Figure 31:
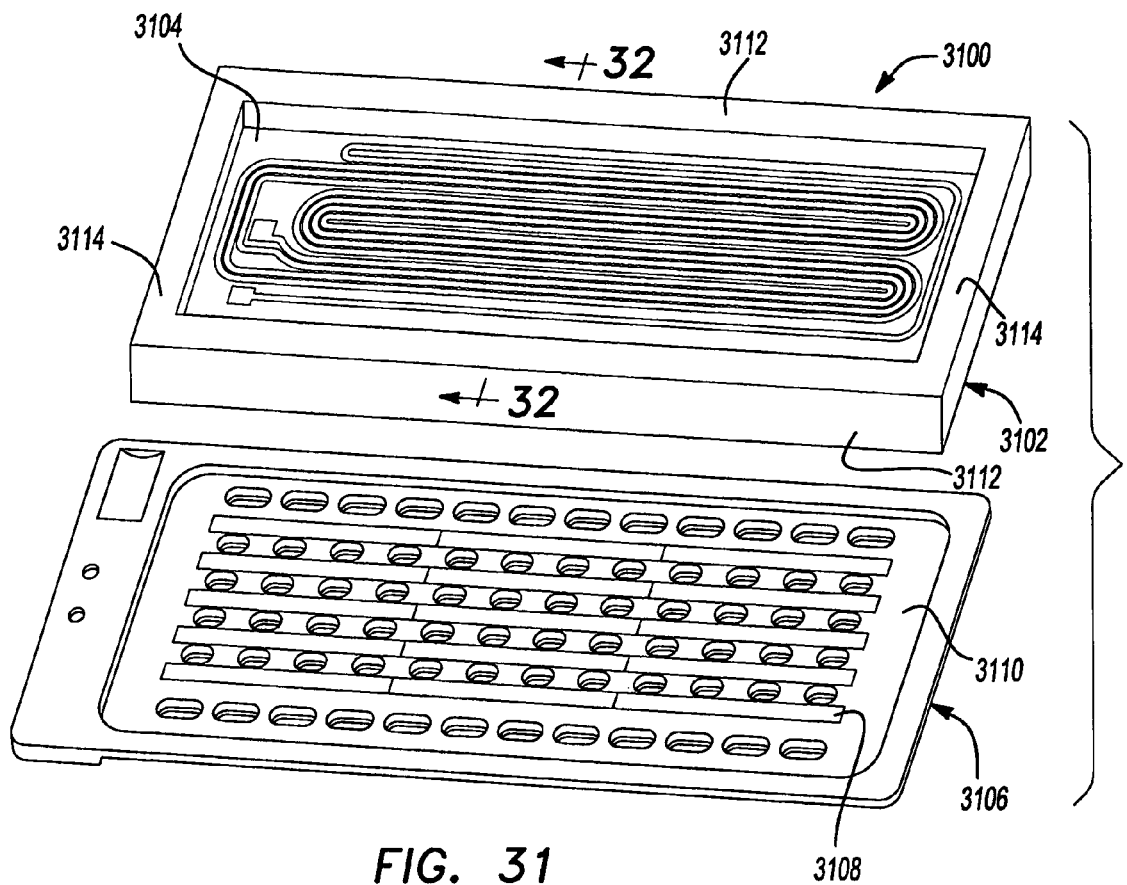
FIG. 31 is an exploded perspective view of another example electro-dynamic loudspeaker.
Figure 32:
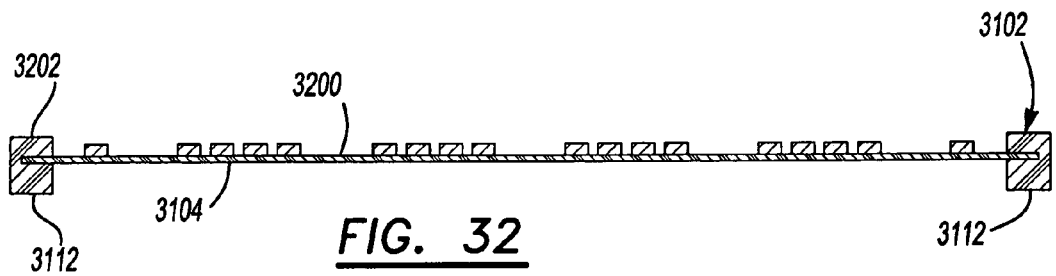
FIG. 32 is a cross-sectional view of a casement and a diaphragm subassembly taken along line 32—32 of the electro-dynamic loudspeaker of FIG. 31.
Figure 33:
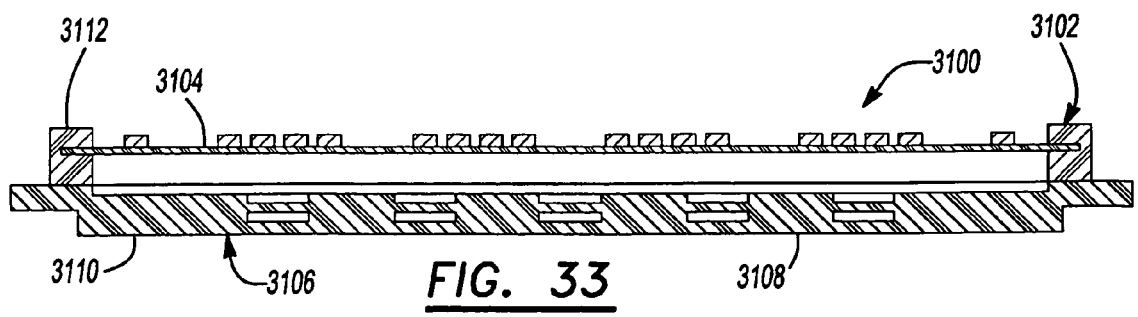
FIG. 33 is a cross-sectional view of the electro-dynamic loudspeaker of FIG. 31.

With reference to FIGS. 31–33, another example loudspeaker is depicted at reference numeral 3100. Loudspeaker 3100 includes a casement 3102 having a diaphragm 3104 coupled to the casement 3102. Loudspeaker 3100 also includes a frame 3106 having a plurality of magnets 3108 coupled to a body portion 3110 of frame 3106.

Casement 3102 includes a pair of generally parallel side rails 3112 orthogonally intersected by a pair of generally parallel end rails 3114. Diaphragm 3104 may be embedded within a portion of each of side rail 3112 and end rail 3114. Casement 3102 may be coupled to frame 3106 to position diaphragm 3104 a predetermined distance from magnets 3108. Casement 3102 may be coupled to frame 3106 using a variety of techniques such as ultrasonic welding, snap fit connections, mechanical fasteners, adhesive bonding or any other suitable connection method.

Figure 35:
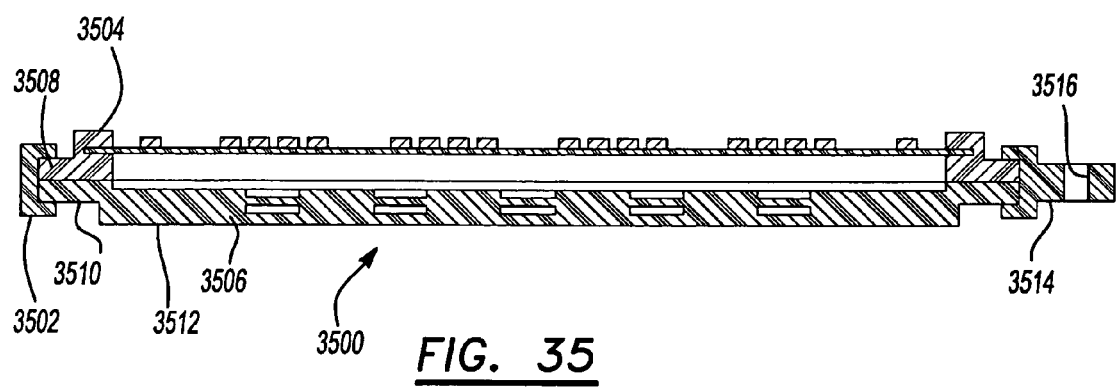
FIG. 35 is a cross-sectional view of another example electro-dynamic loudspeaker that includes a retainer coupling a casement to a frame.

Alternatively, the casement may be coupled with the frame by a securing device in the form of a retainer as shown in FIG. 35. An example loudspeaker 3500 includes a retainer 3502, a casement 3504 and a frame 3506. Casement 3504 includes a flange 3508 radially protruding from the perimeter of casement 3504. Similarly, frame 3506 includes a flange 3510 radially extending from a body portion 3512 of frame 3506. Retainer 3502 is the securing device to couple casement 3504 with frame 3506. In the illustrated example, retainer 3502 has a generally c-shaped cross section capable of engaging flanges 3508 and 3510. Rigid engagement of flanges 3508 and 3510 interconnects casement 3504 and frame 3506.

As shown on the right side of FIG. 35, another example retainer 3502 may also include loudspeaker mounting provisions. The illustrated retainer 3502 includes a flange 3514 having an aperture 3516 extending through the flange 3514. The use of the loudspeaker mounting provisions on retainer 3502 improves design flexibility. For example, a frame and magnet assembly may be designed for use with a variety of differently shaped retainers 3502 configured to mount loudspeakers within certain vehicles or enclosures.

To assemble a loudspeaker equipped with retainer 3502, frame 3506 and casement 3504 may be placed within an injection mold cavity. Molten resin may be injected within the cavity to form retainer 3502. After solidification of the resin, completed loudspeaker 3500 may be ejected from the mold cavity.

Figure 36:
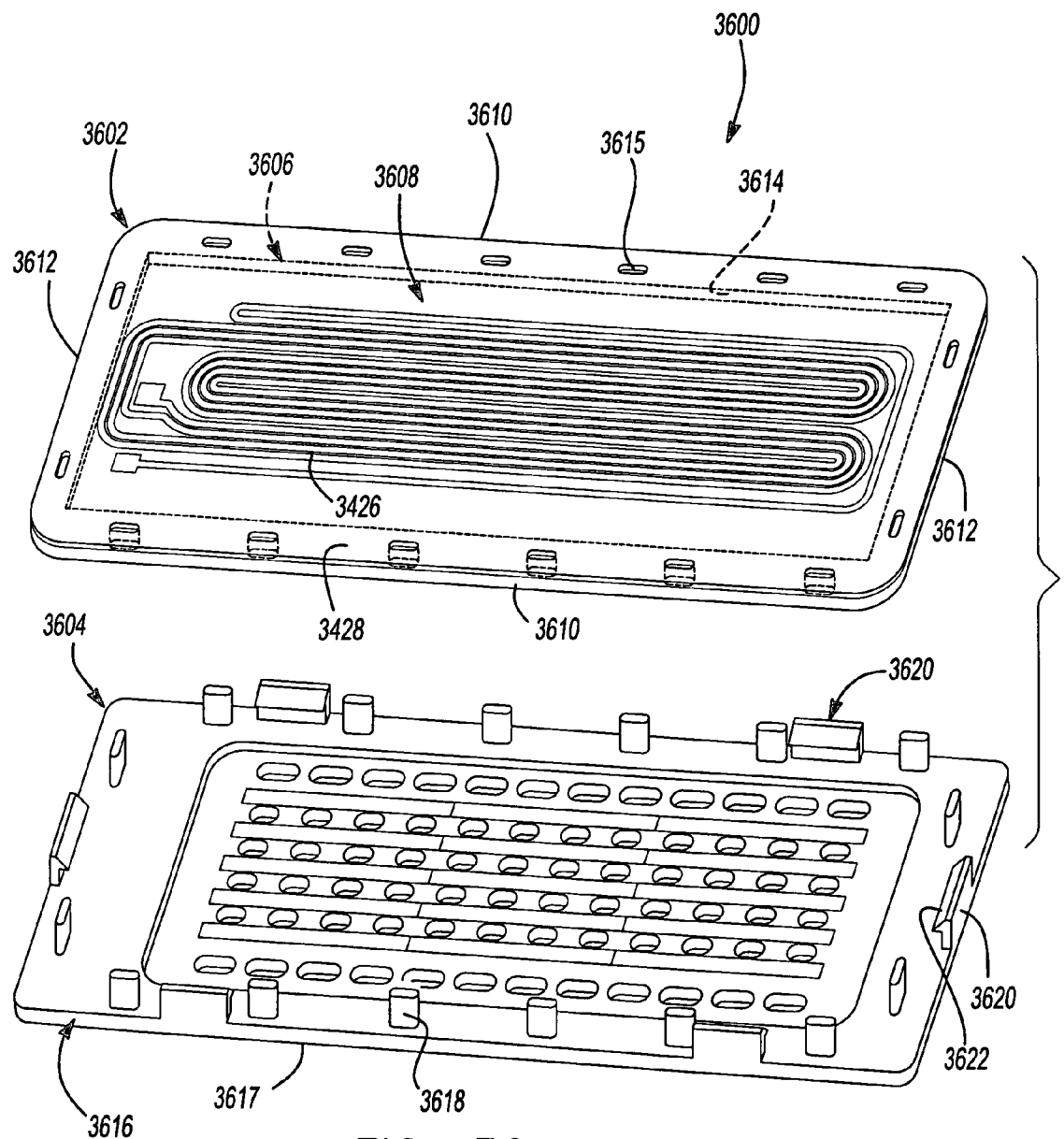
FIG. 36 is an exploded cross-sectional view of yet another example electro-dynamic loudspeaker.
Figure 37:
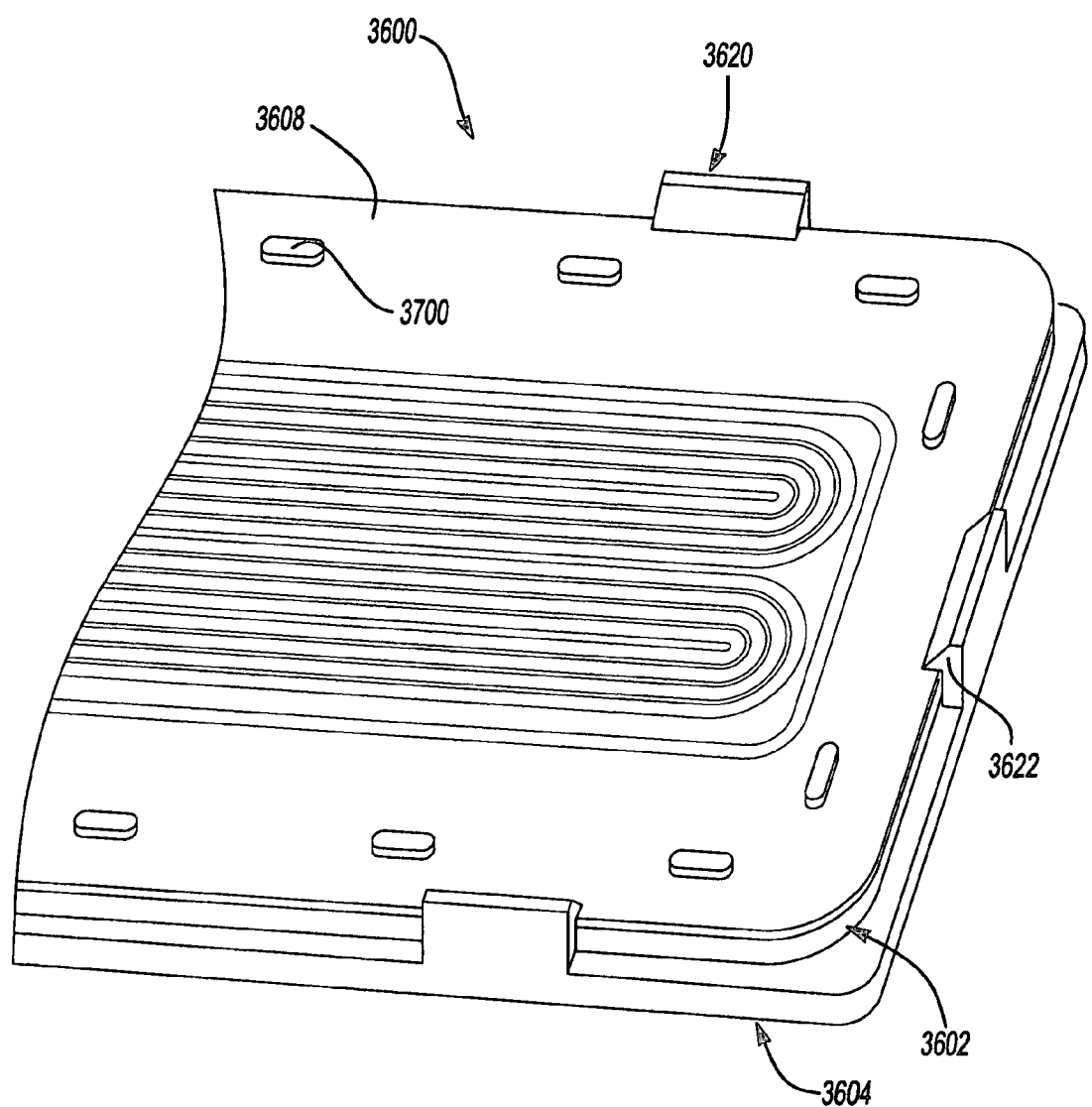
FIG. 37 is a partial perspective view of the electro-dynamic loudspeaker depicted in FIG. 36.

With specific reference to FIGS. 36 and 37, another example loudspeaker 3600 includes an example casement and diaphragm subassembly 3602 and an example frame and magnet assembly 3604. Casement and diaphragm subassembly 3602 includes a casement 3606 and diaphragm 3608. Casement 3606 includes a pair of side rails 3610 and a pair of end rails 3612 interconnected to one another to define an aperture 3614. Side rails 3610 and end rails 3612 include apertures 3615 extending through the side rails 3610 and the end rails 3612.

Frame and magnet subassembly 3604 includes a frame 3616 having a body 3617 with a plurality of stakes 3618 protruding from the body 3617. The frame 3616 also includes a plurality of catches 3620 extending from body 3617. The illustrated catch 3620 includes a barb 3622. During coupling of casement and diaphragm subassembly 3602 to frame and magnet subassembly 3604, barb 3622 may engage casement 3606. In addition, stakes 3618 may protrude through apertures 3615. A subsequent heat staking or melting process may be performed to deform the ends of stakes 3618 to form a cap 3700. The cap 3700 may maintain coupling of casement and diaphragm subassembly 3602 to frame and magnet subassembly 3604. In other examples, any other form of fastening mechanism such as an adhesive, a latch, hook, welding, a snap-fit connection, etc. may be used to couple the casement and diaphragm subassembly 3602 to frame and magnet subassembly 3604.

Figure 34:
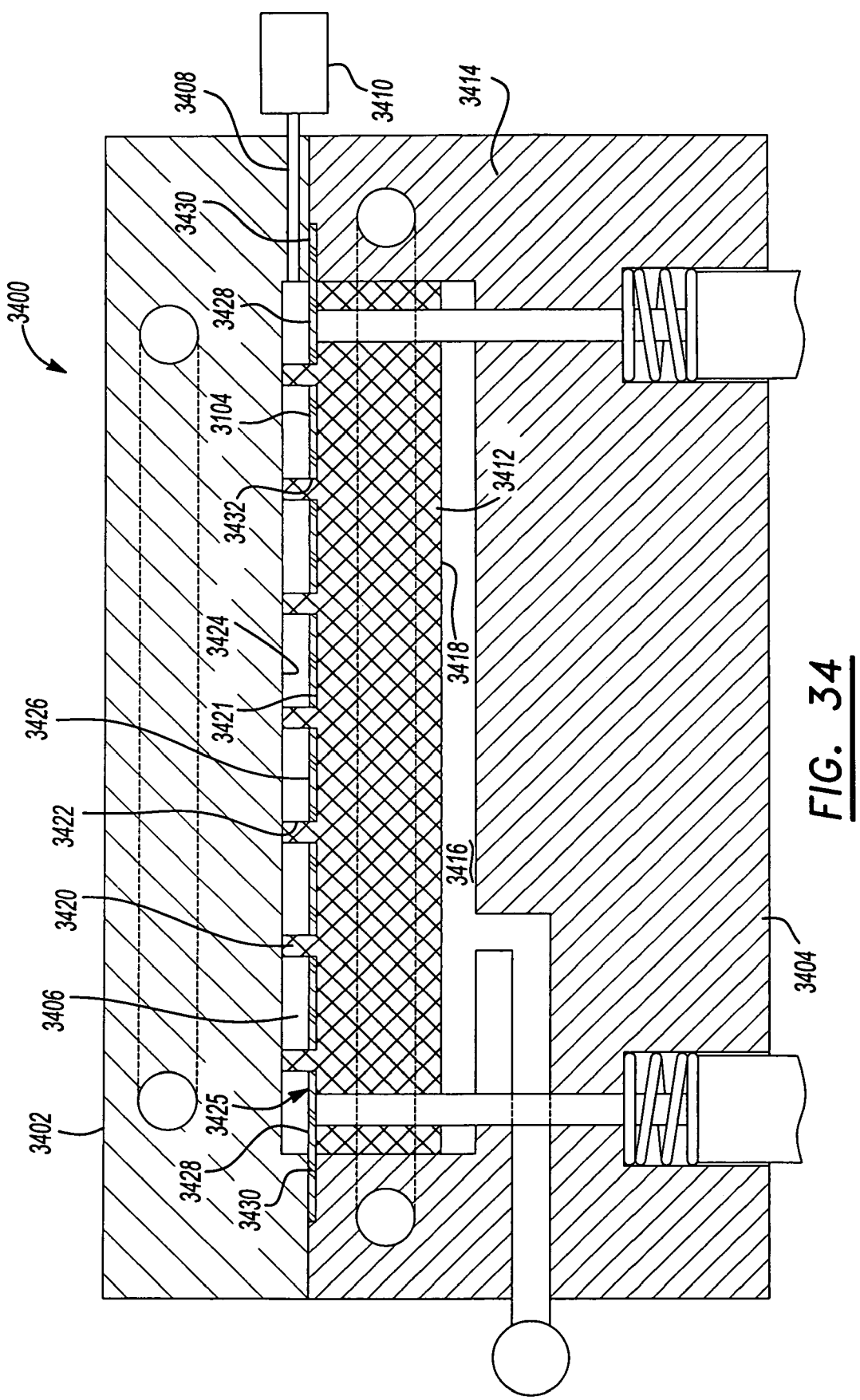
FIG. 34 is a cross-sectional view of an injection mold.

To manufacture loudspeaker 3600, an example injection mold 3400 as shown in FIG. 34 may be used. Injection mold 3400 includes a stationary plate 3402 and a movable plate 3404. Stationary plate 3402 and movable plate 3404 define a cavity 3406 in communication with a gate 3408. Gate 3408 serves as an inlet for a molten resin material 3410. Movable plate 3404 includes a gas permeable plate 3412 inserted within a gas impermeable die body 3414. A vacuum channel 3416 is positioned along a back surface 3418 of plate 3412. Vacuum channel 3416 is coupled to a vacuum source (not shown). Movable plate 3404 includes a plurality of pins 3420 extending upwardly from a substantially planar surface 3421. Each pin 3420 includes an upper surface 3422 which engages a lower surface 3424 of stationary plate 3402 when injection mold 3400 is closed.

An oversized, work-in-progress, example diaphragm 3425 is illustrated as inserted within injection mold 3400 in FIG. 34. Oversized diaphragm 3425 includes a center portion 3426 surrounded by a perimeter portion 3428. Perimeter portion 3428 includes an offage portion 3430 extending beyond the edge of cavity 3406. Finished diaphragm 3608, shown in FIGS. 36 and 37, is created by trimming offage portion 3430 from oversized diaphragm 3425. Diaphragm 3608 also includes a plurality of apertures 3432. Upon insertion of diaphragm 3425, the plurality of pins 3420 extend through apertures 3432 and diaphragm 3425 rests on planar surface 3421.

During manufacture of the casement and diaphragm subassembly, perimeter portion 3428 of diaphragm 3425, specifically offage portion 3430, may be clamped between stationary plate 3402 and movable plate 3404 of injection mold 3400. After perimeter portion 3428 is clamped, center portion 3426 may be displaced to introduce a tension to diaphragm 3425. While diaphragm 3608 is under tension, molten plastic may be injected into cavity 3406 to form side rails 3610 and end rails 3612. During the injection process, perimeter portion 3428 may partially melt and bond with the material forming casement 3606. The casement material may then be cooled and solidified. The tensioned diaphragm 3608 molded to casement 3606 may now be removed from the injection mold 3400. Offage portion 3430 may be trimmed to produce the final casement and diaphragm assembly 3602 as shown in FIG. 36. The casement and diaphragm subassembly may be utilized as a component within many different speaker designs including loudspeakers having metal frames as previously described or molded frames similar to frame 3616.

Figure 38:
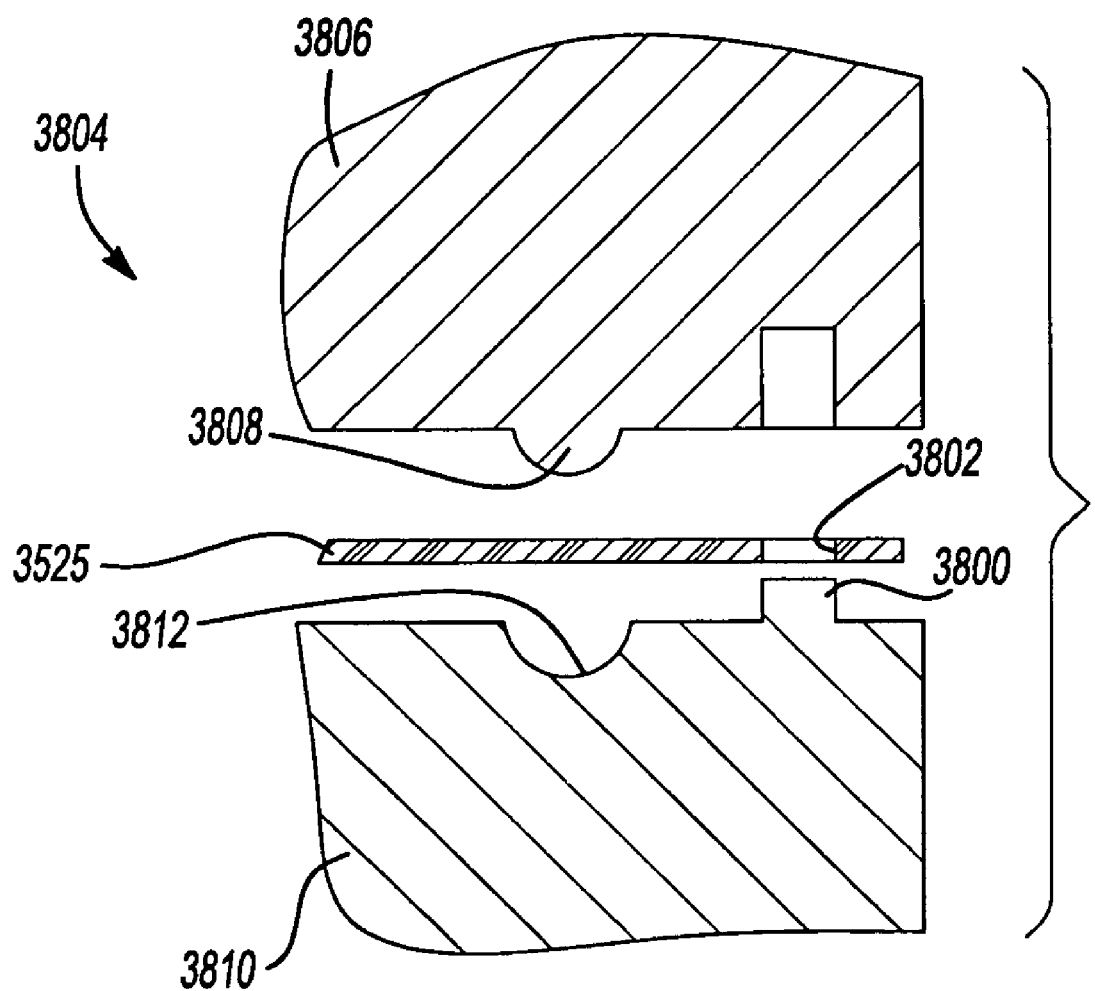
FIG. 38 is a partial cross-sectional view of an alternate injection mold incorporating a film tensioning feature in the mold tool.

It should be appreciated that a number of different devices such as pins, clamps, notches or stops may be used to temporarily fix offage portion 3430 while center portion 3426 is tensioned. One example retention device is shown in FIG. 38 in the form of a pin 3800. Pin 3800 may extend through an aperture 3802 and through diaphragm 3425. Aperture 3802 may be located in offage portion 3430. Pin 3800 may be positioned to retain the perimeter portion of diaphragm 3425 during tensioning. Although illustrated as a pin, a variety of devices such as clamps, pins or stops may be used to locate and retain the perimeter portion of the diaphragm 3425 during tensioning.

FIG. 38 also illustrates a portion of an example injection mold that is depicted at reference numeral 3804. Mold 3804 includes a stationary half 3806 having a ridge 3808 protruding downwardly from the stationary half 3806. Mold 3804 also includes a movable half 3810 having a trough 3812 extending about the periphery of the mold. During mold closure, ridge 3808 contacts diaphragm 3425 and forces diaphragm 3425 to enter trough 3812. During this process, diaphragm 3425 is tensioned and retained under tension. To assure a sufficient amount of tension is generated in diaphragm 3425, pins 3800 may be positioned outboard of ridge 3808 and trough 3812 to retain the perimeter portion of diaphragm 3425 during tensioning. As previously mentioned, molten resin is then injected to form casement 3606.

With reference to FIG. 39, another example loudspeaker is depicted at reference numeral 3900. Loudspeaker 3900 includes a frame 3902 having a plurality of magnets 3904 coupled to a body portion 3906 of frame 3902. An example elastic bumper 3908 may be coupled to frame 3902. Elastic bumper 3908 may be constructed from a material capable of recovering size and shape after deformation such as a solid elastomeric member, closed cell foam or any other resilient material. Elastic bumper 3908 may be coupled to and extend substantially about the perimeter of frame 3902.

Elastic bumper 3908 may be attached to frame 3902 using adhesives or mechanical fasteners. Elastic bumper 3908 may also be molded to frame 3902 using an injection mold. For example, where the frame is constructed from injection molded plastic, frame 3902 may first be formed in a mold. An elastic material, such as polyvinyl may then be injected into the mold to form elastic bumper 3908 on frame 3902. Alternatively, elastic bumper 3908 may be formed in a different mold and coupled with frame 3902 by adhesives, mechanical fasteners, welding, etc.

During assembly of example loudspeaker 3900, elastic bumper 3908 may be compressed by applying an external force in the direction illustrated by arrows 3910. The compression force may be maintained while a diaphragm 3912 is coupled to bumper 3908 by adhesives, mechanical fasteners, welding, etc. Once diaphragm 3912 is fixedly coupled with elastic bumper 3908, the external force compressing elastic bumper 3908 may be removed. Elastic bumper 3908 may then attempt to return to the originally uncompressed shape, but is resisted by diaphragm 3912. An equilibrium condition is reached resulting in tensioning of diaphragm 3912. Elastic bumpers 3908 may extend circumferentially about the entire periphery of frame 3902. Alternatively, the elastic bumpers 3908 may be represented by plurality of small elastomeric portions selectively positioned along opposite sides of frame 3902.

FIG. 40 shows another example loudspeaker 4000 that includes another example of at least one elastic bumper 4002. The elastic bumper 4002 of this example may be a hollow member formed with resilient material. Similar to the FIG. 39, the elastic bumper 4002 may be coupled to a perimeter portion of frame 3902.

During assembly of loudspeaker 4000, elastic bumpers 4002 may be compressed by applying an external force in the direction of arrows 4004. The compression force may be maintained while diaphragm 3912 is mechanically coupled to elastic bumper 4002. Once diaphragm 3912 is fixed to elastic bumper 4002, the external force compressing elastic bumper 4002 may be removed. The tendency of elastic bumper 4002 to return to the uncompressed state is resisted by diaphragm 3912. An equilibrium condition is reached resulting in tensioning of diaphragm 3912.

While various embodiments of the invention have been described, it will be apparent to those of ordinary skill in the art that other embodiments and implementations are possible that are within the scope of this invention. Accordingly, the invention is not restricted except in light of the attached claims and their equivalents.

What is claimed is:

1. An electro-dynamic loudspeaker comprising:
   a diaphragm having an electrical conductor coupled thereto;
   a molded frame having a body defining a mounting plane;
   a plurality of magnets at least partially molded into the body of the frame, where the diaphragm is coupled to the mounting plane, and where each of the magnets is offset from the mounting plane; and
   an electrical terminal at least partially embedded within a portion of the frame where the electrical terminal includes a male prong portion extending from the body of the frame, and where the electrical terminal includes an intermediate portion positioned between the end portion and the male prong portion, the intermediate portion being embedded within the frame, and an end portion extending beyond the surface of the frame to the interior thereof, and wherein the end portion is electrically coupled to an electrical conductor of the diaphragm.

2. The electro-dynamic loudspeaker of claim 1 where each of the magnets has an upper surface, and where the upper surface of each of the magnets is positioned to be substantially coplanar with the upper surface of each of the other magnets.

3. The electro-dynamic loudspeaker of claim 1 where each of the magnets includes an upper surface coplanar with an upper surface of the body of the frame.

4. The electro-dynamic loudspeaker of claim 3 where at least two of the magnets have different thickness.

5. The electro-dynamic loudspeaker of claim 1 where the frame includes a box-like wall partially enclosing the male prong portion of the electrical terminal.

6. An electro-dynamic loudspeaker comprising:
   a molded plastic frame;
   a first magnet and a second magnet integrally molded into the frame;
   the first and second magnets each having a first surface and a second surface, where the first surface of each of the first and second magnets is aligned in substantially a single plane; and
   where each of the first and second magnets includes a slot therein, where the slot is filled with plastic of the frame when the first and second magnets are molded into the frame.

7. The electro-dynamic loudspeaker of claim 6 where the first magnet is positioned in a first row and the second magnet is positioned in a second row to form a magnetic field between the first and second magnets.

8. The electro-dynamic loudspeaker of claim 6 where the first magnet is positioned in the frame with opposite polarity with respect to the polarity of the second magnet.

9. The electro-dynamic loudspeaker of claim 6 where the first magnet comprises a plurality of magnets in a first row and the second magnet comprises a plurality of magnets in a second row.

10. The electro-dynamic loudspeaker of claim 6 where the first and second magnets comprise a plurality of longitudinally extending members positioned end-to-end in a first row and a second row, respectively in the frame.

11. The electro-dynamic loudspeaker of claim 6 where the first surface of the first and second magnets is coplanar with a surface of the frame, and the second surface of the first and second magnets is embedded in the molded plastic frame.

12. The electro-dynamic loudspeaker of claim 6, further comprising a diaphragm, where the diaphragm is mounted to the frame in a state of tension and is spaced apart from the first and second magnets by a determined distance.

13. The electro-dynamic loudspeaker of claim 12, where the diaphragm comprises a thin film coupled with the frame that is a movable membrane capable of producing sound.

14. The electro-dynamic loudspeaker of claim 13, where the thin film is of only one-piece construction.

15. An electro-dynamic loudspeaker comprising:
   a plurality of longitudinally extending magnets; and
   a frame having a first surface and a second surface,
   where the magnets are molded into the first surface of the frame in a plurality of spaced apart rows to extend longitudinally along the first surface, where the magnets also extend partially through the frame towards the second surface;

where the magnets include a slot therein, where the slot is filled with plastic of the frame when the magnet is molded into the frame.

16. The electro-dynamic loudspeaker of claim 15 where the first surface is an inner surface of the frame that is positionable adjacent to a diaphragm and the second is an outer surface of the frame.

17. The electro-dynamic loudspeaker of claim 15 where the frame is a bowed frame.

18. The electro-dynamic loudspeaker of claim 15 where the frame is elastically deformable to tension a diaphragm.

19. The electro-dynamic loudspeaker of claim 15 where the frame includes a plurality of apertures extending from the first surface to the second surface, where the rows of magnets are positioned between rows of the apertures.

20. The electro-dynamic loudspeaker of claim 15 where the magnets are embedded in the frame to be substantially coplanar with the first surface of the frame.

21. The electro-dynamic loudspeaker of claim 19 where the magnets non-uniformly extend toward the second surface to remain coplanar with the first surface.

22. The electro-dynamic loudspeaker of claim 15 where the magnets are generally rectangular and are positioned end-to-end in the rows.

23. An electro-dynamic loudspeaker comprising:
a molded plastic frame;
a first magnet and a second magnet integrally molded into the frame;
the first and second magnets each having a first surface and a second surface, where the first surface of each of the first and second magnets is aligned in substantially a single plane; and
where the first surface of the first and second magnets is coplanar with a surface of the frame, and the second surface of the first and second magnets is embedded in the molded plastic frame, and where each of the first and second magnets includes a slot therein, where the slot is filled with plastic of the frame when the first and second magnets are molded into the frame.

24. An electro-dynamic loudspeaker comprising:
a diaphragm having an electrical conductor coupled thereto;
a molded frame having a body defining a mounting plane;
a plurality of magnets at least partially molded into the body of the frame, where the diaphragm is coupled to the mounting plane, and where each of the magnets is offset from the mounting plane;
an electrical terminal at least partially embedded within a portion of the frame where the electrical terminal includes a portion extending from the body of the frame, and where the electrical terminal includes an intermediate portion positioned between the end portion and the portion, the intermediate portion being embedded within the frame, and an end portion extending beyond the surface of the frame to the interior thereof, and wherein the end portion is electrically coupled to an electrical conductor of the diaphragm; and
where the frame includes a box-like wall partially enclosing the portion of the electrical terminal.

25. An electro-dynamic loudspeaker comprising:
a diaphragm having an electrical conductor coupled thereto;
a molded frame having a body defining a mounting plane;
a plurality of magnets at least partially molded into the body of the frame, where the diaphragm is coupled to the mounting plane,
where each of the magnets is offset from the mounting plane; and
where each of the magnets include a slot therein, where the slot is filled with plastic of the frame when the magnets are molded into the frame.

* * * * *